(12) United States Patent
Nishimura et al.

(10) Patent No.: US 11,545,119 B2
(45) Date of Patent: Jan. 3, 2023

(54) ROTATION MECHANISM AND KEYBOARD APPARATUS

(71) Applicant: YAMAHA CORPORATION, Hamamatsu (JP)

(72) Inventors: Tetsuya Nishimura, Hamamatsu (JP); Naoki Nishimura, Hamamatsu (JP); Yuji Takahashi, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 17/155,530

(22) Filed: Jan. 22, 2021

(65) Prior Publication Data

US 2021/0241725 A1 Aug. 5, 2021

(30) Foreign Application Priority Data

Feb. 5, 2020 (JP) .............................. JP2020-018088

(51) Int. Cl.
| G10C 3/18 | (2006.01) |
| F16C 17/02 | (2006.01) |
| F16C 33/08 | (2006.01) |
| G10H 1/34 | (2006.01) |

(52) U.S. Cl.
CPC ............... G10C 3/18 (2013.01); F16C 17/02 (2013.01); F16C 33/08 (2013.01); G10H 1/346 (2013.01); G10H 2220/221 (2013.01)

(58) Field of Classification Search
CPC ............ G10C 3/18; F16C 17/02; F16C 33/08; G10H 1/346; G10H 2220/221
See application file for complete search history.

(56) References Cited

U.S. PATENT DOCUMENTS

| 2013/0152769 A1* | 6/2013 | Suzuki | ..................... G10B 3/12 84/719 |
| 2019/0043463 A1 | 2/2019 | Ichiki | |
| 2019/0378486 A1 | 12/2019 | Kamiya | |

FOREIGN PATENT DOCUMENTS

| JP | 2017173698 A | * | 9/2017 | ............... G10B 3/12 |
| JP | 2017173706 A | * | 9/2017 | ............... G10B 3/12 |
| JP | 2017173706 A | | 9/2017 | |
| WO | 2018174001 A1 | | 9/2018 | |

* cited by examiner

Primary Examiner — Jianchun Qin
(74) Attorney, Agent, or Firm — Rossi, Kimms & McDowell LLP

(57) ABSTRACT

A rotation mechanism includes a shaft portion, a bearing portion, a protruding portion, and a stopper. The bearing portion configured to rotate with respect to a predetermined axis as a center of rotation and configured to slide relative to an outer periphery of the shaft portion. The protruding portion protrudes from the shaft portion. The stopper is integrally formed the bearing portion. The stopper faces the protruding portion. A length of the protruding portion in a direction in which the protruding portion protrudes is larger than a distance from the center of rotation to a sliding portion where the bearing portion slides relative to the outer periphery of the shaft portion.

11 Claims, 30 Drawing Sheets

ROTATION MECHANISM AND KEYBOARD APPARATUS

CROSS REFERENCE TO RELATED APPLICATION

This application is based upon and claims the benefit of priority from the prior Japanese Patent Application No. 2020-018088 filed on Feb. 5, 2020, the entire contents of which are incorporated herein by reference.

FIELD

One embodiment of the present disclosure relates to a rotation mechanism and a keyboard apparatus. In particular, an embodiment of the present disclosure relates to a keyboard apparatus with a hammer assembly attached using a rotation mechanism.

BACKGROUND

Acoustic pianos, such as conventional grand pianos and upright pianos, are composed of many parts. An assembly of these parts is so complex that the assembly work takes a long time. In particular, since an action mechanism provided corresponding to respective keys is composed of many components, the assembling operation thereof is also very complicated.

The action mechanism has a hammer with a weight below the key to provide a sensation to player's fingers through the key (hereinafter, it is called a touch feeling). The hammer rotates so as to lift the weight provided on the hammer in response to a key depression operation of the key. For example, a hammer shown in Japanese laid-open patent publication No. 2017-173706 and International publication No. 2018-174001 is rotatably attached in a case where a bearing portion opened in a circular shape is fitted to a shaft portion. The hammer has a shaft stopper extending from the bearing portion toward the shaft portion. The shaft stopper suppresses detaching the hammer from the shaft portion.

SUMMARY

A rotation mechanism according to an embodiment of the present disclosure includes a shaft portion, a bearing portion, a protruding portion, and a stopper. The bearing portion configured to rotate with respect to a predetermined axis as a center of rotation and configured to slide relative to an outer periphery of the shaft portion. The protruding portion protrudes from the shaft portion. The stopper is integrally formed with the bearing portion. The stopper faces the protruding portion. A length of the protruding portion in a direction in which the protruding portion protrudes is larger than a distance from the center of rotation to a sliding portion where the bearing portion slides relative to the outer periphery of the shaft portion.

A rotation mechanism according to an embodiment of the present disclosure includes a shaft portion, a bearing portion, a stopper, a stopper-contacting portion, and a reinforcing member. The bearing portion configured to rotate with respect to a predetermined axis as a center of rotation and configured to slide relative to an outer periphery of the shaft portion. The stopper is integrally formed with the bearing portion. The stopper-contacting portion is disposed between the shaft portion and the stopper. The stopper-contacting portion configured to in contact the stopper in a case where the bearing intends to detach from the shaft portion. The reinforcing member extends in a direction intersecting a direction in which the shaft portion extends. The shaft portion and the stopper-contacting portion are connected to the reinforcing member outside of both of opening ends of the bearing portion.

A keyboard apparatus according to an embodiment of the present disclosure includes a key, a hammer assembly, a sensor, and a sound source unit. The hammer assembly is rotated by the rotation mechanism mentioned above in response to a press of the key. The sensor configured to detect an operation of the key. The sound source unit configured to generate a sound waveform signal in response to an output signal from the sensor.

DETAILED DESCRIPTION

Figure 1:
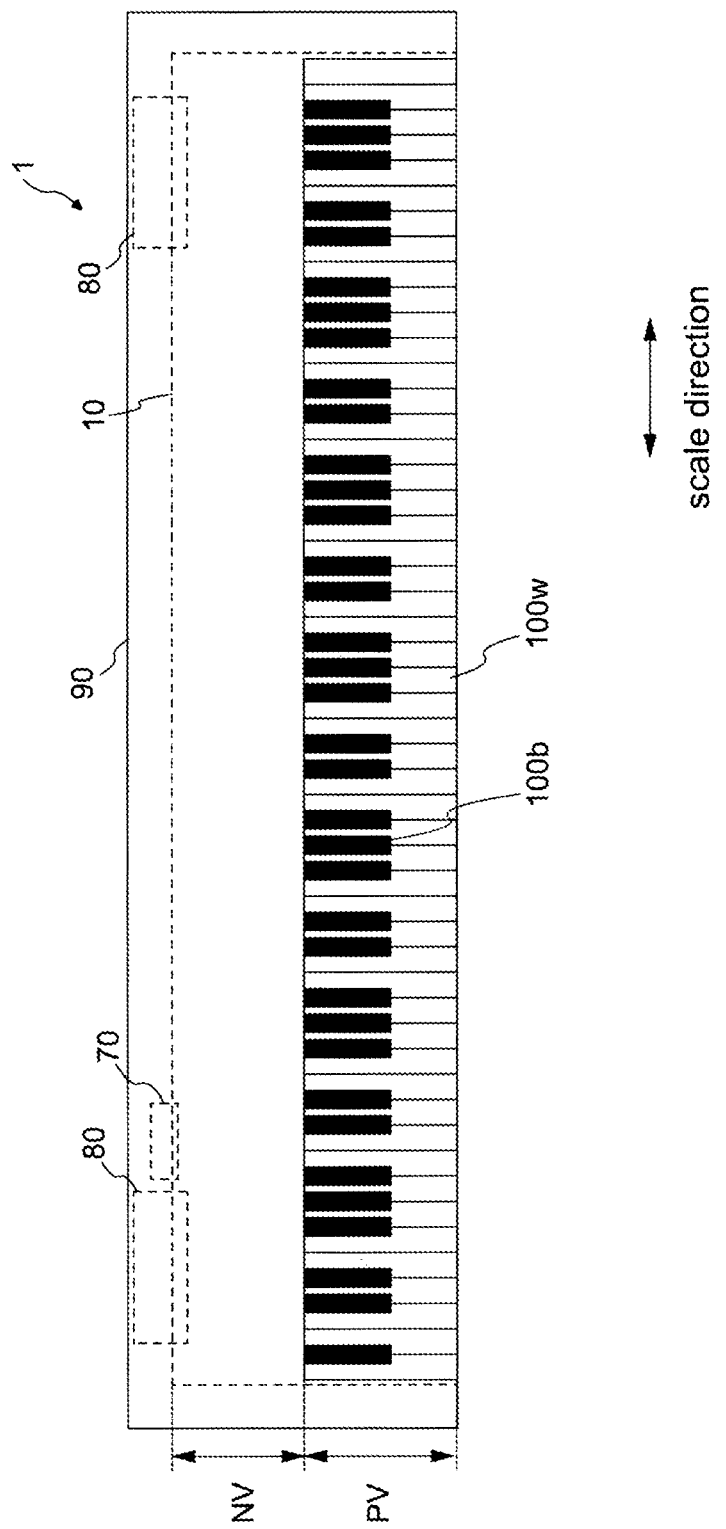
FIG. 1 is a diagram showing a configuration of a keyboard apparatus according to an embodiment of the present disclosure.

Hereinafter, a keyboard apparatus according to an embodiment of the present disclosure will be described in detail by referring to the drawings. The following embodiments are examples of embodiments of the present disclosure, and the present disclosure is not to be construed as being limited to these embodiments. In the drawings referred to in the present embodiment, the same portions or portions having similar functions are denoted by the same reference numerals or similar reference numerals (only A, B, etc. are denoted after numerals). Repeated descriptions of the above symbols may be omitted. For convenience of description, the dimensional ratios of the drawings (ratios between the respective components, ratios in the vertical and horizontal directions, and the like) may be different from the actual ratios, or a part of the configurations may be omitted from the drawings. In the following explanation, "rotating" means relatively operation. For example, "member A rotates relative to member B" may mean that member B rotates relative to a fixed member A, member A rotates relative to a vice versa fixed member B, and member A and member B both rotate. In the following descriptions, the expressions "up", "upper", "upper end", "down", "lower" and "lower end" may be used based on the vertical directions in the respective drawings. However, these vertical directions merely explain the relationship of the relative directions, and the vertical directions may be reversed.

First Embodiment

[Configuration of Keyboard Apparatus]

FIG. 1 is a diagram showing a configuration of a keyboard apparatus according to the first embodiment. In this embodiment, a keyboard apparatus 1 is an electronic keyboard instrument that sounds in response to a key depression by a user (player) such as an electronic piano. The keyboard apparatus 1 may be a keyboard-type controller that outputs control data (e.g., MIDI) for controlling an external sound source apparatus in response to a key depression. In this instance, the keyboard apparatus 1 may not have a sound source apparatus.

The keyboard apparatus 1 includes a keyboard assembly 10. The keyboard assembly 10 includes a white key 100w and a black key 100b. A plurality of white keys 100w and a plurality of black keys 100b are arranged side by side. The number of keys 100 is N, in this example, the N is 88. A direction in which the plurality of white keys 100w and the plurality of black keys 100b are arranged is referred to as a scale direction. When the white key 100w and the black key 100b are not particularly distinguished from each other, the white key 100w and the black key 100b are referred to as keys 100. In the following description, a configuration with "w" at the end of a symbol is a configuration corresponding to the white key. A configuration with "b" at the end of a symbol is a configuration corresponding to the black key.

A part of the keyboard assembly 10 exists within a housing 90. When the keyboard apparatus 1 is viewed from above, a portion of the keyboard assembly 10 covered by the housing 90 is referred to as a non-appearing portion NV, and a portion exposed from the housing 90 and visible to the user is referred to as an appearing portion PV. That is, the appearing portion PV is a part of the keys 100 and indicates a region that can be played and operated by the user. Hereinafter, a portion of the keys 100 exposed in the appearing portion PV may be referred to as a key body portion.

Inside the housing 90, a sound source apparatus 70 and a speaker 80 are disposed. The sound source apparatus 70 generates an acoustic waveform signal with the depression of the keys 100. The speaker 80 outputs the acoustic waveform signal generated by the sound source apparatus 70 to an external space. The keyboard apparatus 1 may include a slider for controlling volume, a switch for switching timbres, a display for displaying various data, and the like.

According to descriptions in this specification, the directions such as the up, down, left, right, front, and back indicate the directions when the keyboard apparatus 1 is viewed from the player when the player plays the keyboard apparatus 1. For example, it can be expressed that the non-appearing portion NV is located on the back side of the appearing portion PV. In some cases, the direction is indicated based on the keys 100, such as the key front end side (key front side) or the key rear end side (key rear side). In this case, the key front end side is the front side of the keys 100 as viewed from the player. The key rear end side is the back side of the keys 100 as viewed from the player. According to the above definitions, it can be expressed that the portion of the black key 100b from the front end to the rear end of the key body portion of the black key 100b protrudes upward from the white key 100w.

Figure 2:
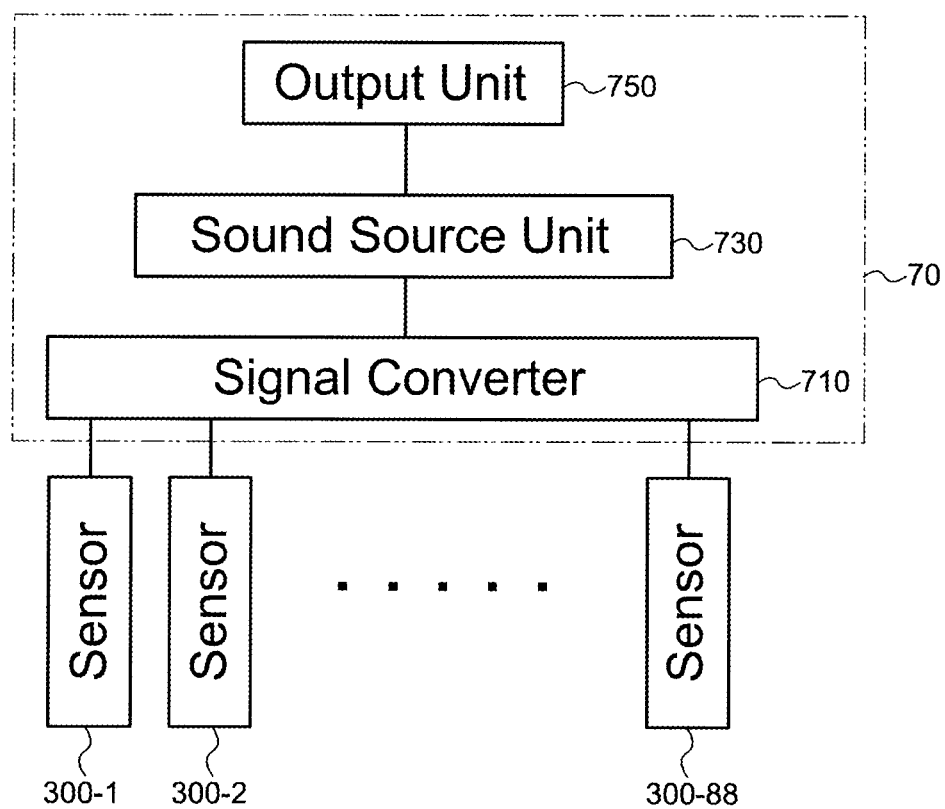
FIG. 2 is a block diagram showing a configuration of a sound source apparatus according to an embodiment of the present disclosure.

FIG. 2 is a block diagram showing a configuration of the sound source apparatus according to the first embodiment.

The sound source apparatus 70 includes a signal converter 710, a sound source unit 730 and an output unit 750. A sensor 300 is provided corresponding to each key 100. The sensor 300 detects an operation of the key and outputs a signal corresponding to the detected content. In this example, the sensor 300 outputs signals in accordance with the three-stage key depression quantity. Depending on the time interval of these signals, key depression rate is detectable.

The signal converter 710 acquires an output signal from the sensor 300 (the sensors 300-1 and 300-2, . . . , 300-88 corresponding to the 88 keys 100) and generates and outputs an operation signal corresponding to the operation state in each key 100. In this instance, the operation signal is a signal in the form of MIDI. The signal converter 710 outputs note on in response to a key depression operation. A key number indicating which of the 88 keys 100 has been operated and velocity corresponding to the key depression rate are output in association with the note on. On the other hand, in response to a key release operation, the signal converter 710 outputs the key number and note off in association with each other. A signal corresponding to other operations such as a pedal may be input to the signal converter 710, and may be reflected in the operation signal.

The sound source unit 730 generates the acoustic waveform signal based on the operation signal output from the signal converter 710. The output unit 750 outputs the acoustic waveform signal generated by the sound source unit 730. The acoustic waveform signal is output to, for example, the speaker 80 or an acoustic waveform signal output terminal.

[Configuration of Keyboard Assembly]

Figure 3:
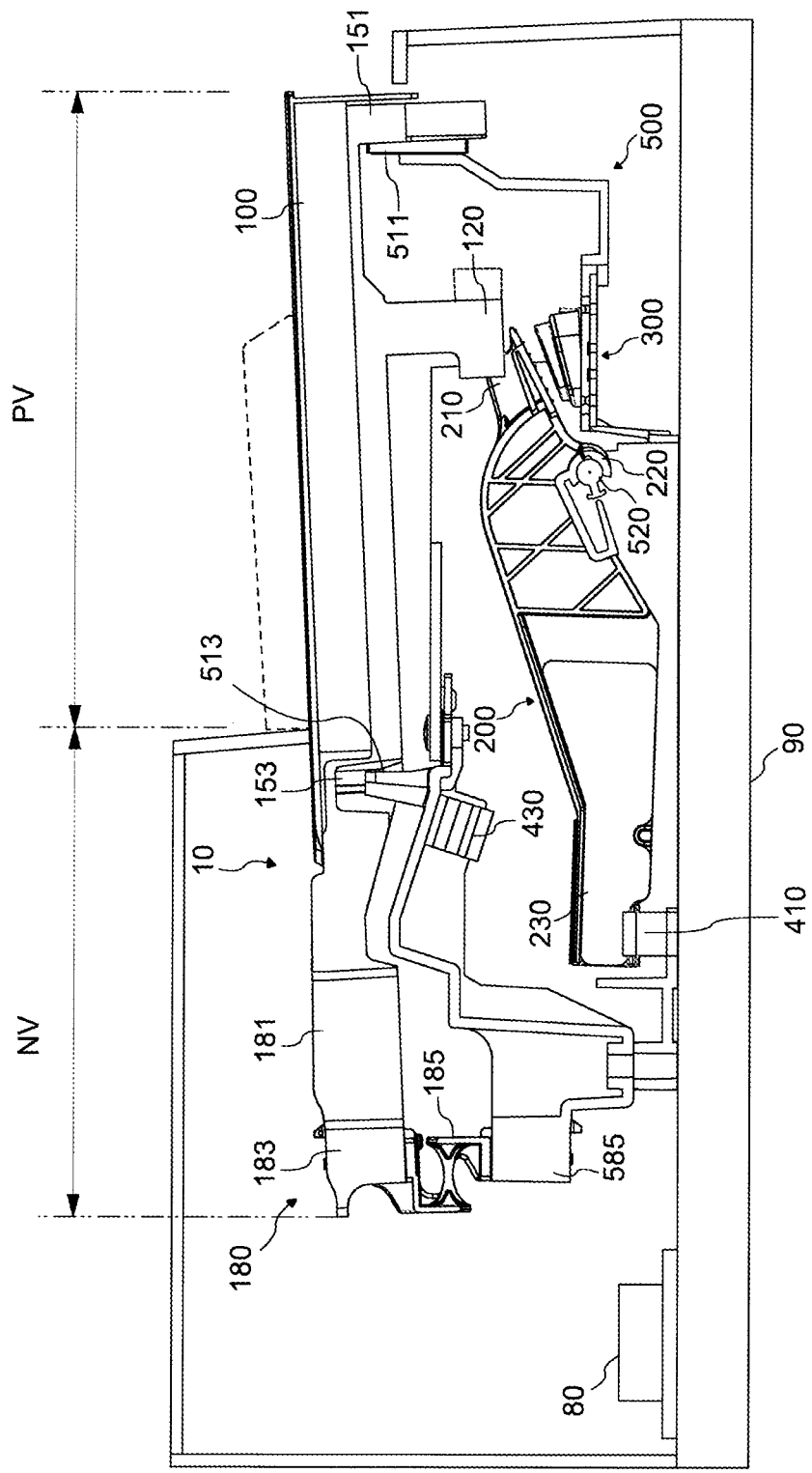
FIG. 3 is a side view of an internal configuration of a housing according to an embodiment of the present disclosure.

FIG. 3 is a side view of an internal configuration of the housing according to the first embodiment. As shown in FIG. 3, the keyboard assembly 10 and the speaker 80 are disposed inside the housing 90. The speaker 80 is disposed on the back side of the keyboard assembly 10. The speaker 80 is arranged so as to output a sound corresponding to the key depression toward the upper and lower of the housing 90. The sound output downward proceeds from the lower surface of the housing 90 to the outside. On the other hand, the sound output upward passes from the inside of the housing 90 through the space inside of the keyboard assembly 10, and proceeds outward from gaps between the adjacent the keys 100 in the appearing portion PV or gaps between the key 100 and the housing 90.

The configuration of the keyboard assembly 10 will be described referring to FIG. 3. In addition to the keys 100 described above, the keyboard assembly 10 includes a connection portion 180, a hammer assembly 200, and a frame 500. The keyboard assembly 10 is a resin structure manufactured by injection molding or the like in most configurations. The frame 500 is fixed to the housing 90. The connection portion 180 rotatably connects the keys 100 to the frame 500. The connection portion 180 includes a board-shaped flexible member 181, a key-side support portion 183 and a rotation member 185. The board-shaped flexible member 181 extends rearwardly from the rear end of the keys 100. The key-side support portion 183 extends rearwardly from the rear end of the board-shaped flexible member 181. The rotation member 185 is supported by the key-side support portion 183 and a frame-side support portion 585 of the frame 500. That is, the rotation member 185 is disposed between the keys 100 and the frame 500. The bending of the rotation member 185 causes the keys 100 to rotate relative to the frame 500. The rotation member 185 is detachable from the key-side support portion 183 and the frame-side support portion 585. The rotation member 185 may be integral with the key-side support portion 183 and the frame-side support portion 585 and may be bonded to the key-side support portion 183 and the frame-side support portion 585. That is, the rotation member 185 may be configured so as not to be detachable from the key-side support portion 183 and the frame-side support portion 585.

The key 100 includes a front end key guide 151 and a side surface key guide 153. The front end key guide 151 is slidably in contact with a front end frame guide 511 of the frame 500 in state of covering the front end frame guide 511. The front end key guide 151 is in contact with the front end frame guide 511 on both sides in the scale direction at the top and bottom parts of the front end key guide 151. The side surface key guide 153 is slidably in contact with a side surface frame guide 513 on both sides of the side surface frame guide 513 in the scale direction. In this embodiment, the side surface key guide 153 is disposed on a region of the side surface of the keys 100 corresponding to the non-appearing portion NV, and is existed closer to the key front end side than the connection portion 180 (the board-shaped flexible member 181). However, the side surface key guide 153 may be disposed on a region corresponding to the appearing portion PV.

The hammer assembly 200 is rotatably attached to the frame 500. Thus, the hammer assembly 200 may be referred to as a "rotation member." The hammer assembly 200 rotates while a bearing portion 220 of the hammer assembly 200 and a shaft portion 520 of the frame 500 slide. More specifically, in the viewpoint of the direction in which the shaft portion 520 extends, the bearing portion 220 rotates with the shaft portion 520 as a center of rotation while sliding with an outer periphery of the shaft portion 520. A front end portion 210 of the hammer assembly 200 slidably contacts generally anterior-posterior direction in the internal space of a hammer support unit 120 in the keys 100. This sliding portion, that is, a part where the front end portion 210 and the hammer support unit 120 contacts, is located below the key 100 in the appearing portion PV (front of the rear end of the key body portion). Configurations of the connecting part (rotation mechanism) of the shaft portion 520 and the bearing portion 220 will be described in detail later.

The hammer assembly 200 includes a metallic weight portion 230 at the back of the rotating shaft. Normally (when the key is not depressed), the weight portion 230 is in a state of being placed on a lower stopper 410, and the front end portion 210 of the hammer assembly 200 is pushing the key 100 upward. When the key is depressed, the weight portion 230 is moved upward and collides with an upper stopper 430. The hammer assembly 200 applies a weight to the player who depresses the keys by the weight portion 230. The lower stopper 410 and the upper stopper 430 are formed of a cushioning material or the like (nonwoven fabric, elastic body, or the like).

The sensor 300 is attached to the frame 500 below the hammer support unit 120 and the front end portion 210. When the sensor 300 is squashed on the lower surface of the front end portion 210 by the depression of the key, the sensor 300 outputs a detection signal. As described above, the sensor 300 is provided corresponding to each key 100.

[Configuration of the Rotation Mechanism of Hammer Assembly]

Figure 4:
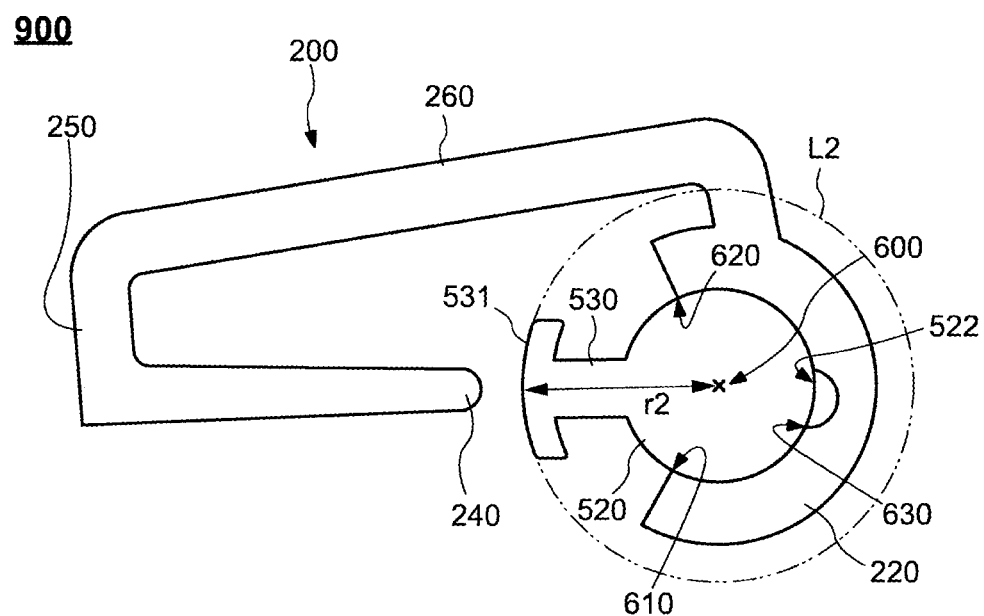
FIG. 4 is a partial enlarged view of a rotation mechanism in an embodiment of the present disclosure, and shows a state of a bearing portion attached to a shaft portion.
Figure 5:
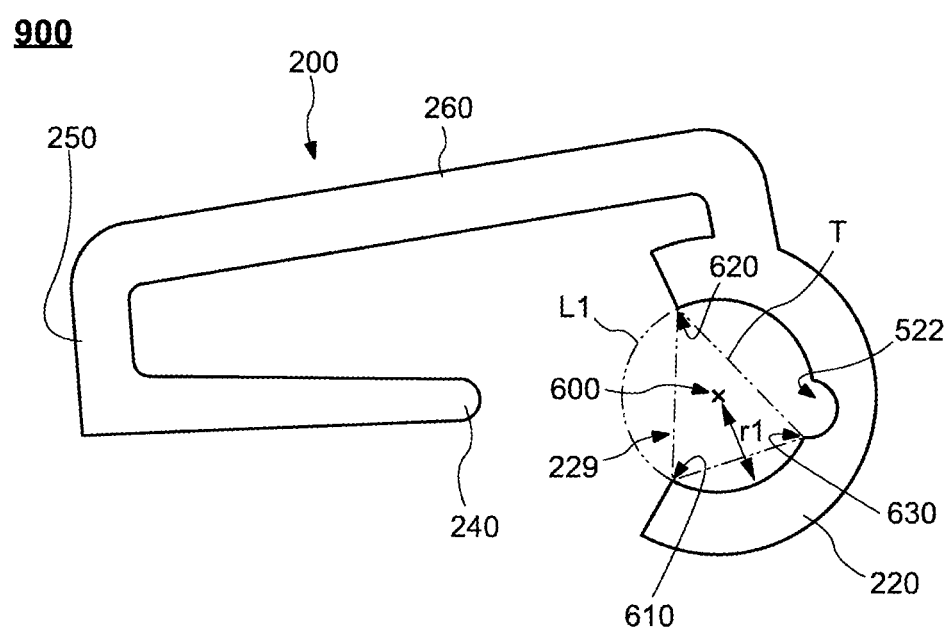
FIG. 5 is a partial enlarged view of a rotation mechanism in an embodiment of the present disclosure, and is an exploded view showing only a bearing portion.

FIGS. 4 and 5 are partial enlarged views of the rotation mechanism according to an embodiment of the present disclosure. FIG. 4 is a diagram showing a state in which the bearing portion 220 is attached to the shaft portion 520. FIG. 5 is an exploded view showing only the bearing portion 220.

A configuration in which the hammer assembly 200 is connected to the shaft portion 520 is described in detail referring to FIGS. 4 and 5.

For example, a large load is applied to a rotating shaft of a rotation mechanism such as a hammer member or the like shown in Japanese laid-open patent publication No. 2017-173706 and International publication No. 2018-174001. For example, if the hammer rotates in response to extraordinarily strong key-strikes, the rotating shaft of the hammer may be applied an exceptionally large load and the rotating shaft may be damaged. One of the objects of the present disclosure is to realize a rotation mechanism having high mechanical strength and in which the bearing portion is hardly detached from the shaft portion, and the above object is achieved by the rotation mechanism used in the following hammer assembly 200.

The hammer assembly 200 includes the bearing portion 220, a stopper 240, a connecting portion 250, and a body portion 260. The bearing portion 220 and the stopper 240 are connected via the connecting portion 250 and the body portion 260 and move or rotate integrally. The bearing portion 220 extends downward from the body portion 260, and has a form capable of holding the shaft portion 520. The connecting portion 250 extends downward from the body portion 260. The stopper 240 is connected to a lower end of the connecting portion 250 and extends from the connecting portion 250 toward the bearing portion 220. Specifically, the stopper 240 extends toward a center of rotation 600 of the shaft portion 520. The stopper 240 has flexibility. The bearing portion 220 is attached to the shaft portion 520 by curving the stopper 240. The direction in which the stopper 240 is curved is a direction intersecting the direction connecting a tip portion of the stopper 240 and the center of rotation 600. The stopper 240 is not curved in a direction in which the bearing portion 220 is detached from the shaft portion 520. That is, even if the bearing portion 220 intends to detach from the shaft portion 520, and the stopper 240 is pushed by a stopper contact portion (stopper-contacting portion) 531 which is a part of a protruding portion 530, the stopper 240 is not curved so that detachment of the bearing portion 220 from the shaft portion 520 is suppressed.

As shown in FIG. 5, in the bearing portion 220, an opening 229 for holding the shaft portion 520 is provided. An inner surface of the opening 229 is a part of an arc (circular arc) of a circle L1. A center of the circle L1 is the center of rotation 600, and a radius of the circle L1 is r1. As shown in FIG. 4, the center of rotation 600 exists within the shaft portion 520. A concave portion 522 is provided on a part of the inner surface of the opening 229. That is, the inner surface of the opening 229, except for the concave portion 522, has a continuous arc shape from an opening end portion 610 to an opening end portion 620. The concave portion 522 may be utilized as a grease reservoir.

The protruding portion 530 is provided on an end portion of the shaft portion 520. The shaft portion 520 extends in the scale direction and is connected to a wall member 590 which will be described later (referring to FIG. 12). An outer surface of the shaft portion 520 is a part of the arc of the circle L1 around the center of rotation 600. The protruding portion 530 extends from the shaft portion 520 toward the stopper 240. The protruding portion 530 extends from an inside of the circle L1 toward an outside of the circle L1 described above through between the opening end portions 610, 620. In other words, the protruding portion 530 protrudes outwardly of the shaft portion 520 from the center of rotation 600 because the length of the protruding portion 530 protruding from the center of rotation 600 toward the stopper 240 is larger than the distance from the center of rotation 600 to a sliding portion where the bearing portion 220 slides relative to the outer periphery of the shaft portion 520. Here, the sliding portion is a portion where the bearing portion 220 slides relative to the shaft portion 520. For example, a part where the bearing portion 220 slides relative to the shaft portion 520 at the opening end portions 610, 620, and a contact point 630 described below can be referred to as the sliding portion. The protruding portion 530 is contactable with the stopper 240 at a rotation range of the bearing portion 220 relative to the shaft portion 520. The stopper contact portion 531 is a tip portion of the protruding portion 530, and is a portion that contacts the stopper 240 when the bearing portion 220 intends to detach from the shaft portion 520. The stopper contact portion 531 extends in a direction intersecting the direction in which the protruding portion 530 protrudes from the shaft portion 520. Specifically, the shape of the stopper contact portion 531 is a part of an arc of a circle L2. A center of the circle L2 is the center of rotation 600, and a radius of the circle L2 is r2.

A rotation mechanism 900 is configured by the bearing portion 220, the shaft portion 520, the protruding portion 530, and the stopper 240. In the description below, a configuration will be described in which the bearing portion 220 fixed to the hammer assembly 200 rotates relative to the shaft portion 520 fixed to the frame 500. However, in the following embodiments, the rotation mechanism 900 may be applied to a configuration in which the bearing portion 220 is fixed to the frame 500 and the shaft portion 520 is fixed to the hammer assembly 200.

The bearing portion 220 rotates around the shaft portion 520 while sliding with the shaft portion 520. In other words, the shaft portion 520 is held by the bearing portion 220 inscribed in the opening 229. The bearing portion 220 is attached to the shaft portion 520 in a snap-fit method. That is, a distance between the opening end portions 610 and 620 of the bearing portion 220 is smaller than a diameter of the shaft portion 520. In the rotation range of the hammer assembly 200, the inner surface of the opening 229 and the outer surface of the shaft portion 520 are a part of the arc of the circle L1 centered on the center of rotation 600 of the shaft portion 520.

In FIGS. 4 and 5, since both the inner surface of the opening 229 and the outer surface of the shaft portion 520 are a part of the arc of the circle L1, the bearing portion 220 and the shaft portion 520 slide in the region of the arc. The center of rotation 600 exists on a triangle T formed by any three points (e.g., two contact points in the opening end portions 610, 620 and the contact point 630) of a point or a region at which the shaft portion 520 and the bearing portion 220 slide in order for the bearing portion 220 to rotate in a case where the bearing portion 220 holds the shaft portion 520 as described above. That is, the center of rotation 600 exists on three sides of the triangle T or in a region surrounded by the three sides of the triangle T. In other words, each angle formed by the straight lines extending to the three points from the center of rotation 600 is 180 degrees or less. In the present embodiment, since all of the three points are located on the inner surface of the opening 229, it can be said that the bearing portion 220 covers the shaft portion 520 so that the three points are connected continuously. In this case, it can be said that the protruding portion 530 protrudes toward the outside of the circle L1 through a region that the bearing portion 220 is not continuous, i.e. between the opening end portions 610, 620 of the opening 229.

The protruding portion 530 protrudes outward of the circle L1 with respect to the center of rotation 600. In other words, when the three points are defined as described above, it can be said that the protruding portion 530 protrudes farther than any of the three points with respect to the center of rotation 600. In other words, the distance from the center of rotation 600 to the stopper contact portion 531 is larger than the distance from the center of rotation 600 to each sliding portion. If the distances from the center of rotation 600 to the three points differ from each other, the protruding portion 530 protrudes outward from a circle having the center of rotation 600 as the center and the circle passing through a point farthest from the center of rotation 600 among the three points.

Figure 6:
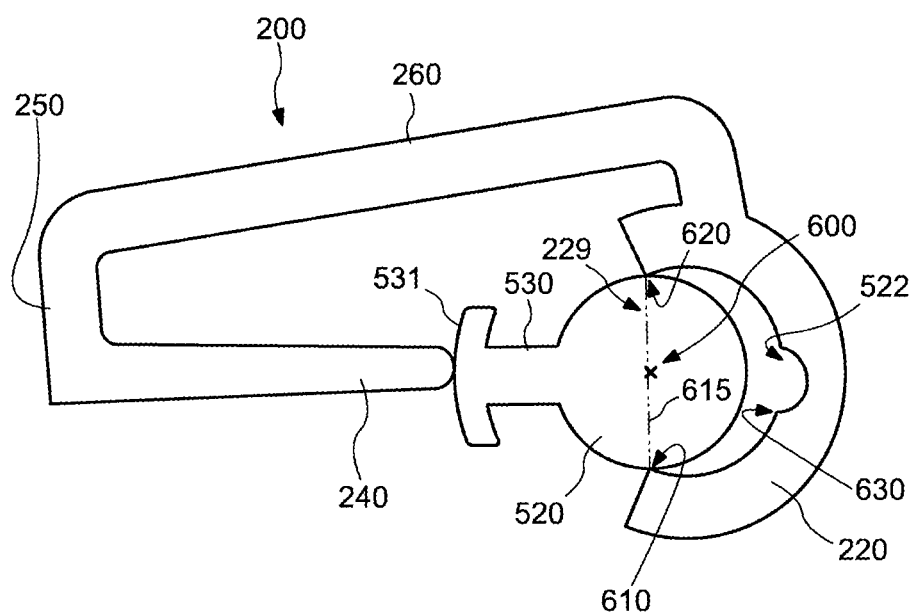
FIG. 6 is a diagram showing a state in a case where a rotation member intends to detach from a shaft portion according to an embodiment of the present disclosure.

FIG. 6 is a diagram showing a state in which the rotation member intends to detach from the shaft portion according to an embodiment of the present disclosure. When a strong external force is applied to the rotation mechanism 900 in a direction separating the shaft portion 520 and the bearing portion 220 from each other, the bearing portion 220 moves in a direction to intend to detach from the shaft 520 while the gap between the opening end portions 610, 620 is pushed out by the shaft 520. With this movement, the stopper 240 moves closer to the shaft portion 520. In a state where the shaft portion 520 is normally held by the bearing portion 220 (the state shown in FIG. 4), as described above, the center of rotation 600 exists on a triangle formed by any three points of the point or the region where the shaft portion 520 and the bearing portion 220 slide. However, the shaft portion 520 and the bearing portion 220 are in contact with only at two points when the bearing portion 220 intends to detach from the shaft portion 520 as shown in FIG. 6. That is, in a state where the bearing portion 220 intends to detach from the shaft portion 520, in the state of being held normally described above, the shaft portion 520 and the bearing portion 220 are non-contact at least any one of the points among the contact points of the three points. In this state, the stopper 240 and the stopper contact portion 531 are configured to contact each other. By the stopper 240 contacting with the stopper contact portion 531, the above-mentioned movement is restricted. FIG. 6 is a diagram showing this state.

As described above, even if the bearing portion 220 intends to detach from the shaft portion 520, prior to the center of rotation 600 outwardly beyond a line segment 615 connecting the opening end portions 610, 620 from the opening 229, the stopper 240 contacts the stopper contact portion 531. In other words, in a state where the stopper contact portion 531 and the stopper 240 is configured to contact, a distance from the center of rotation 600 to the stopper 240 exceeds a distance from the line segment 615 connecting the opening end portions 610, 620 corresponding to both ends of the bearing portion 220 in contact with the shaft portion 520 to the stopper 240. In this condition, the opening end portions 610, 620 pushed out by the shaft portion 520 will intend to return to its original form by the restoring force of the bearing portion 220. When the stopper 240 in a state shown in FIG. 6 contacts the stopper contact portion 531 and the movement of the bearing portion 220 is restricted, the bearing portion 220 intends to return to the original state (the state shown in FIG. 4) by the restoring force described above.

In the present embodiment, a configuration in which the stopper 240 extends from lower end of the connecting portion 250 toward the center of rotation 600 is exemplified, but the present invention is not limited to this configuration. The stopper 240 may contact the stopper contact portion 531 when the bearing portion 220 intends to detach from the shaft portion 520 and need not necessarily extend toward the center of rotation 600. In the present embodiment, a configuration in which both shapes in the region where the bearing portion 220 and the shaft portion 520 slide are arc is exemplified, but it is not limited to this configuration. For example, one of the bearing portion 220 and the shaft portion 520 may be in point contact with the other. That is, either one of the bearing portion 220 and the shaft portion 520 may be provided with a protrusion portion that realizes a point contact. In the present embodiment, a configuration in which the contact points (610, 620, 630) between the bearing portion 220 and the shaft portion 520 are the distance of the radius r1 from the center of rotation 600 is exemplified, but it is not limited to this configuration. For example, the distances from the center of rotation 600 to each of the three contacts where the bearing portion 220 and the shaft portion 520 are contact may be different. That is, the concave portion recessed inwardly of the circle L1 than the arc of the circle L1 on the outer periphery of the bearing portion 220 may be provided. The concave portion may be used as a greasing.

In the present embodiment, a configuration in which the width in the vertical direction of the stopper contact portion 531 is larger than the width in the vertical direction of the other region of the protruding portion 530 is exemplified but is not limited to this configuration. That is, the width in the vertical direction of the protruding portion 530 may not be changed from the shaft portion 520 to the stopper contact portion 531. The shape of the stopper contact portion 531 may not be a part of the arc of the circle L2.

As described above, according to the rotation mechanism 900 of the present embodiment, even when a strong external force is applied in a direction to separate the shaft portion 520 and the bearing portion 220 from each other, detachment of the bearing portion 220 from the stopper 240 is suppressed by contacting the stopper 240 with the protruding portion 530 (the stopper contact portion 531). Therefore, the rotation mechanism in which the bearing portion 220 is hardly detached from the shaft portion 520 is realized. Furthermore, the mechanical strength of the shaft portion 520 is improved by the protruding portion 530 is provided in the shaft portion 520.

Since the concave portion 522 is provided on the inner surface of the opening 229, the contact area between the bearing portion 220 and the shaft portion 520 is reduced, so that the frictional force in rotational operation of the bearing portion 220 and the shaft portion 520 is reduced. A concave portion may be provided on the outer periphery of the shaft portion 520 instead of the concave portion 522.

[Operation of Keyboard Assembly 10]

Figure 7:
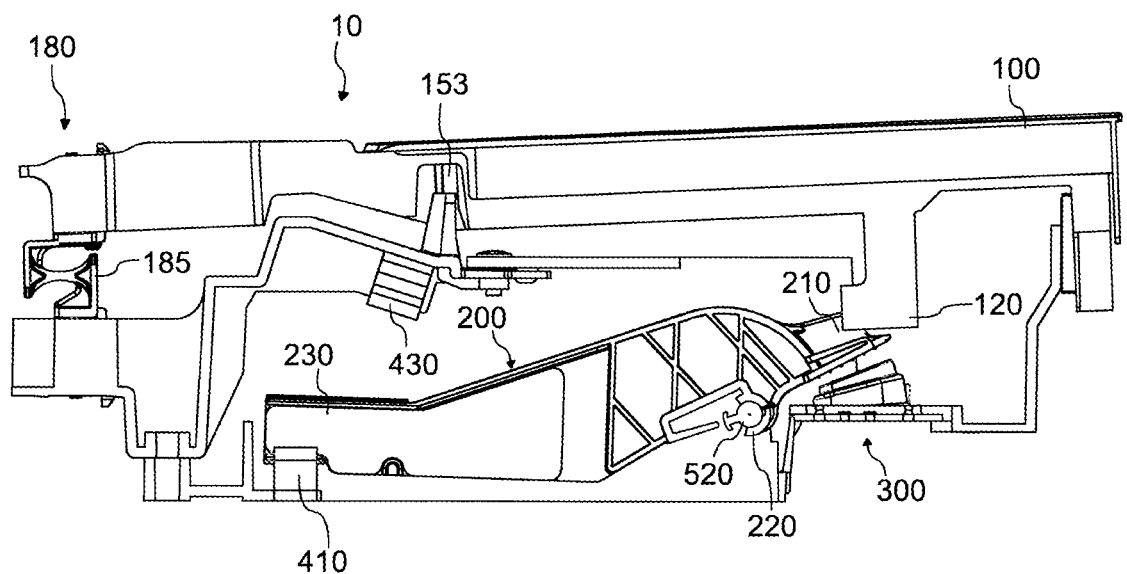
FIG. 7 is a diagram illustrating an operation of a key assembly when a key (white key) is not depressed (when a key is released) in an embodiment of the present disclosure.
Figure 8:
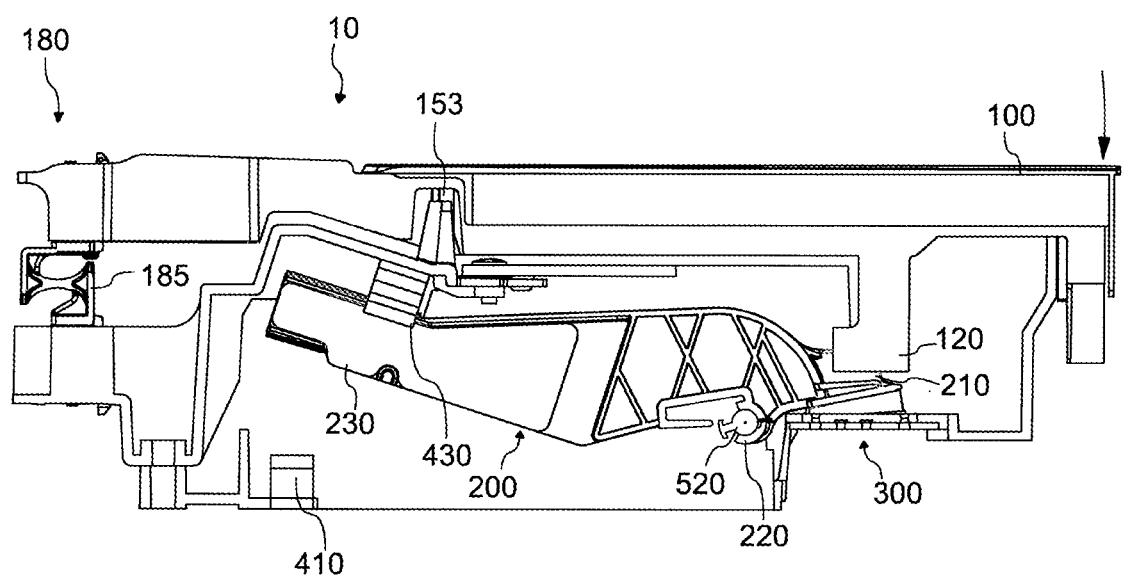
FIG. 8 is a diagram illustrating an operation of a key assembly when a key (white key) is depressed (when a key is depressed) in an embodiment of the present disclosure.

FIGS. 7 and 8 are diagrams illustrating an operation of the key assembly when the key (white key) is depressed according to an embodiment of the present disclosure. FIG. 7 is a diagram showing a case where the key 100 is in a rest position (a state in which the key is not depressed). FIG. 8 is a diagram showing a case when the key 100 is in an end position (a state in which the key is depressed to the end). When the key 100 is depressed, a part of the rotation member 185 is bent relative to the rotation member 185 as a center of rotation. In this state, although the bending deformation is caused forward (toward the front direction) the key, the key 100 does not move forward but rotates relative to the rotation member 185 due to the restriction of anterior-posterior direction movement by the side surface key guide 153. The hammer support unit 120 depresses the front end portion 210 so that the hammer assembly 200 rotates relative to the shaft portion 520. By the weight portion 230 colliding with the upper stopper 430, rotation of the hammer assembly 200 stops and the key 100 reaches the end position. When the sensor 300 is crushed by the front end portion 210, the sensor 300 outputs a detection signal in a plurality of stages corresponding to the crushed quantity (key depressing quantity).

On the other hand, when the key is released, the weight portion 230 moves downward, the hammer assembly 200 rotates and the key 100 rotates upward. By the weight portion 230 is in contact with the lower stopper 410, the rotation of the hammer assembly 200 stops and the key 100 returns to the rest position. In the keyboard apparatus 1 in the first embodiment, as described above, the key 100 rotates relative to the connection portion 180 by depressing and releasing the key 100.

[State of Rotation Mechanism 900 with Operation of Keyboard Assembly 10]

Figure 9:
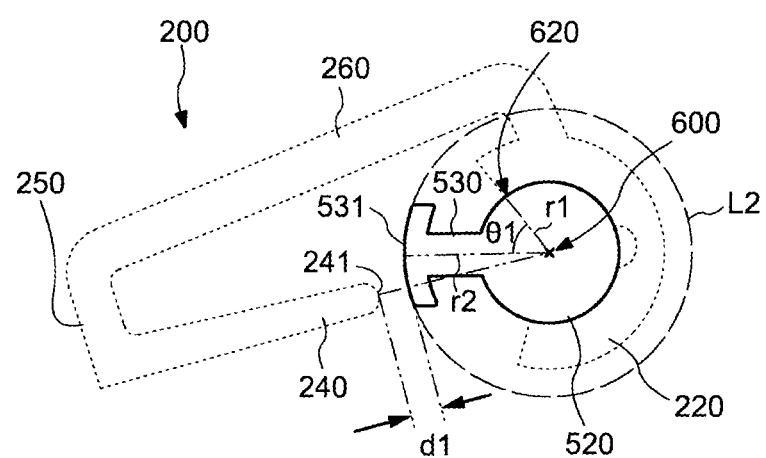
FIG. 9 is a diagram illustrating a positional relationship between a protruding portion and a stopper and a positional relationship between an opening of a bearing portion and a protruding portion in a rotating state in a rotation mechanism according to an embodiment of the present disclosure.
Figure 10:
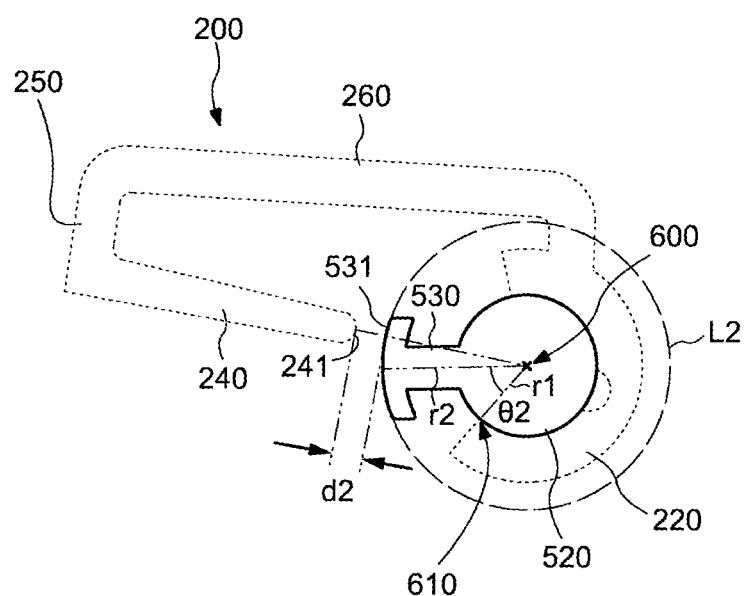
FIG. 10 is a diagram illustrating a positional relationship between a protruding portion and a stopper and a positional relationship between an opening of a bearing portion and a protruding portion in a rotating state in a rotation mechanism according to an embodiment of the present disclosure.

FIGS. 9 and 10 are diagrams illustrating the positional relationship between the protruding portion and the stopper and the positional relationship between the opening of the bearing portion and the protruding portion in each rotating state in the rotation mechanism in an embodiment of the present disclosure. FIG. 9 shows a state of the rotation mechanism 900 when the key 100 is in the rest position as in FIG. 7. FIG. 10 shows a state of the rotation mechanism 900 when the key 100 is in the end position as in FIG. 8.

As shown in FIGS. 9 and 10, in the rotation range of the rotation mechanism 900, the protruding portion 530 (or the stopper contact portion 531) is on a straight line connecting a tip portion 241 of the stopper 240 and the center of rotation 600. As described above, the shape of the stopper contact portion 531 of the protruding portion 530 is a part of the arc of the circle L2 having the radius r2. The center of the circle L2 is the center of rotation 600. Therefore, at the rest position of FIG. 9 and the end position of FIG. 10, the distance between the tip portion 241 of the stopper 240 and the stopper contact portion 531 is the same. That is, the distance d1 between the tip portion 241 and the stopper contact portion 531 in FIG. 9 is the same as the distance d2 between the tip portion 241 and the stopper contact portion 531 in FIG. 10. Therefore, in the rotation range of the rotation mechanism 900, even if the bearing portion 220 intends to detach from the shaft portion 520 in any condition from the rest position to the end position, the stopper 240 contacts the protruding portion 530 under the condition that the bearing portion 220 intends to return to the original state by the restoring force of the bearing portion 220.

The protruding portion 530 is provided between the opening end portion 620 at the rest position described above and the opening end portion 610 at the end position. That is, as in FIGS. 9 and 10, the protruding portion 530 is provided within the range of the angle θ1+angle θ2. The angle 81 is an angle formed by the protruding direction of the protruding portion 530 protrudes from the center of rotation 600 and the direction toward the opening end portion 620 from the center of rotation 600 at the rest position. The angle θ2 is an angle formed by the protruding direction and the direction toward the opening end portion 610 from the center of rotation 600 at the end position.

[Configuration of Shaft Portion 520 and Bearing Portion 220]

Figure 11:
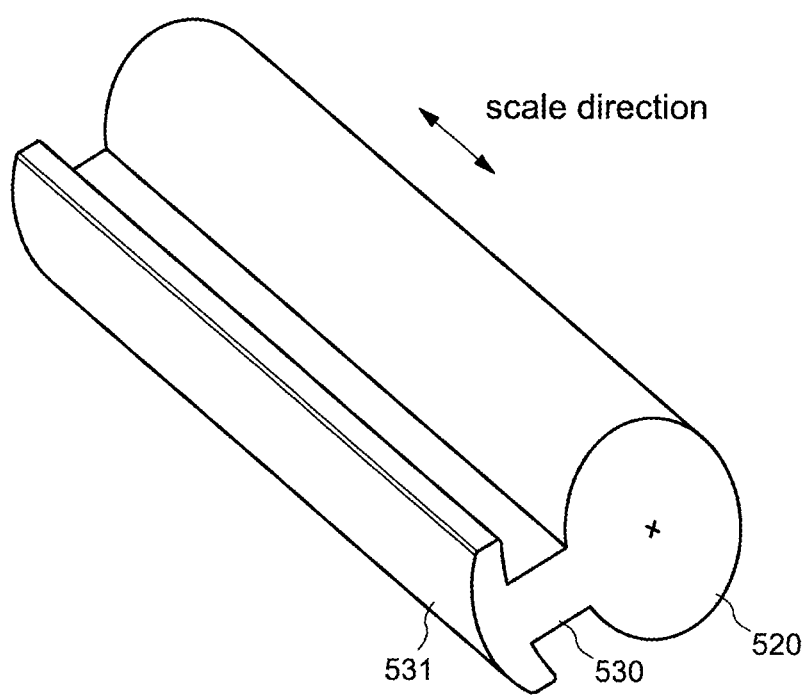
FIG. 11 is a perspective view of a shaft portion of a rotation mechanism according to an embodiment of the present disclosure.

A detailed configuration of the shaft portion 520 and the bearing portion 220 will be described referring to FIGS. 11 to 13. FIG. 11 is a perspective view showing a shaft portion of the rotation mechanism according to an embodiment of the present disclosure. As shown in FIG. 11, the protruding portion 530 extends in the scale direction similar to the shaft portion 520. It can be said that the protruding portion 530 is provided in common to a plurality of rotation mechanisms 900 because the hammer assemblies 200 are arranged side by side in the scale direction. In other words, the shaft portion 520 and the protruding portion 530 included in the adjacent rotation mechanisms 900 are connected to each other. According to the above configuration, the protruding portion 530 functions as a reinforcement member for the shaft portion 520. Furthermore, by providing the stopper contact portion 531 extending in a direction intersecting the direction in which the protruding portion 530 protrudes at the tip of the protruding portion 530, the stopper contact portion 531 functions as a reinforcing member for the protruding portion 530. As described above, by providing the protruding portion 530 and the stopper contact portion 531 in the shaft portion 520, the mechanical strength of the shaft portion 520 is improved.

Figure 12:
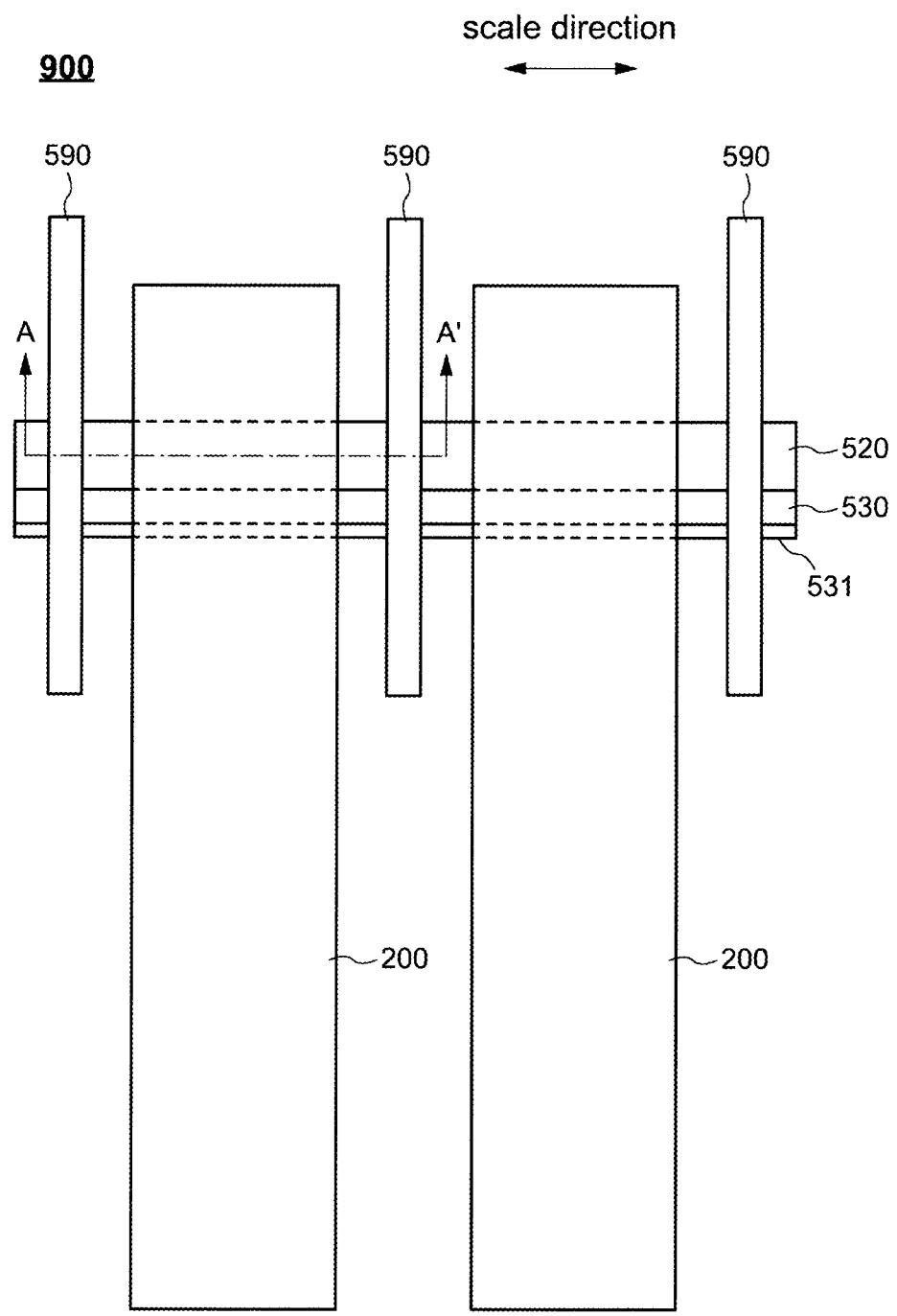
FIG. 12 is a top view showing a hammer assembly and a shaft portion according to an embodiment of the present disclosure.

FIG. 12 is a top view showing the hammer assembly and the shaft portion according to an embodiment of the present disclosure. As described above, the shaft portion 520 and the protruding portion 530 extend toward the scale direction. The shaft portion 520 and the protruding portion 530 are connected to a plurality of wall members 590 (reinforcement member). The plurality of wall members 590 are arranged in a scale direction. The wall member 590 extends in a direction intersecting the direction in which the shaft portion 520 extends. In the embodiment of FIG. 12, the wall member 590 is a board-shaped member and has a surface that intersects the direction (i.e., scale direction) in which the shaft portion 520 extends. More specifically, the wall member 590 has a plane orthogonal to the direction in which the shaft portion 520 extends. The hammer assembly 200 is provided between the adjacent wall members 590. The hammer assembly 200 is attached to the shaft portion 520. The above-described wall member 590 functions as a reinforcement member for the shaft portion 520. As described above, by connecting the shaft portion 520 to the wall member 590, the mechanical strength of the shaft portion 520 is improved.

Figure 13:
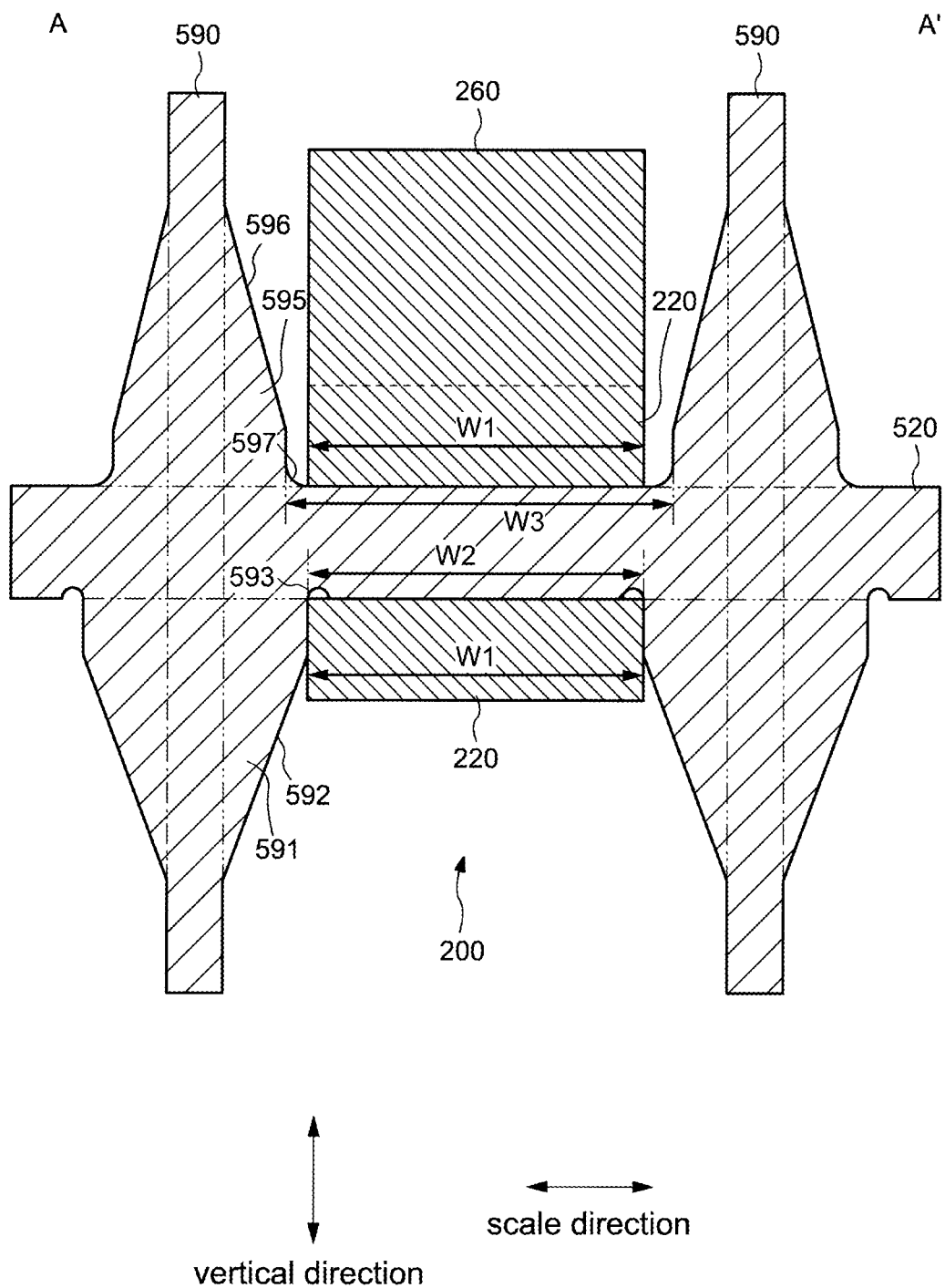
FIG. 13 is a cross-sectional view showing a hammer assembly and a shaft portion according to an embodiment of the present disclosure.

FIG. 13 is a cross-sectional view showing the hammer assembly and the shaft portion according to an embodiment of the present disclosure. Specifically, the cross-sectional view shown in FIG. 13 is a cross-sectional view along A-A' line of FIG. 12. As shown in FIG. 13, the shaft portion 520 and the wall member 590 is formed integrally. The shaft portion 520 is a columnar member extending in the scale direction, the wall member 590 is a board-shaped member extending in the vertical direction. The bearing portion 220 sandwiches the shaft portion 520 from the vertical direction. The body portion 260 is shown further above the bearing portion 220 at the upper side of the shaft portion 520.

A first rib 591, a first curved portion 593, a second rib 595, and a second curved portion 597 are provided between the shaft portion 520 and the wall member 590. The first rib 591 connects the shaft portion 520 and the wall member 590 below the shaft portion 520. The first rib 591 has an inclined surface 592 inclined from the wall member 590 toward the shaft portion 520. The first curved portion 593 is provided so as to connect the first rib 591 and the shaft portion 520. The first curved portion 593 is provided to form a concave portion in the shaft portion 520. The second rib 595 connects the shaft portion 520 and the wall member 590 above the shaft portion 520. The second rib 595 has an inclined surface 596 inclined from the wall member 590 toward the shaft portion 520. The second curved portion 597 is curved above the shaft portion 520 so as to round the corner formed by the second rib 595 and the shaft portion 520. In other words, the second curved portion 597 is provided so as to protrude upward of the shaft portion 520.

As shown in FIG. 13, a distance W2 between the first ribs 591 facing each other is substantially the same as a width W1 of the bearing portion 220 in the scale direction. On the other hand, a distance W3 between the second ribs 595 facing each other is larger than the W1. That is, the movement of the hammer assembly in the scale direction 200 is restricted by the first rib 591. In other words, one of the ribs provided above and below the shaft portion 520 restricts the movement of the hummer assembly 200 in the scale direction.

By the first curved portion 593 is provided between the first rib 591 and the shaft portion 520, the internal stress generated between them is relaxed. By the second curved portion 597 is provided between the second rib 595 and the shaft portion 520, the internal stress generated between them is relaxed. The first curved portion 593 is provided so as to form a concave portion to the shaft portion 520, stress relaxation of the above and the restriction of the movement of the hammer assembly 200 in scale direction are compatible with each other. By providing the second curved portion 597 so as to protrude above the shaft portion 520, the durability of the shaft portion 520 is improved against the external force received from above the shaft portion 520. In the present embodiment, the shaft portion 520 is subjected to an external force that the bearing portion 220 depresses the shaft portion 520 from above by depressing the key. Therefore, since it is required to increase the durability against the external force from above the shaft portion 520, as described above, the second rib 595 and the second curved portion 597 are provided above the shaft portion 520.

In the present embodiment, a configuration in which the shaft portion 520 and the wall member 590 are integrally formed is exemplified, but the present invention is not limited to this configuration. For example, the shaft portion 520 and the wall member 590 may be formed separately, and the wall member 590 may be attached to the shaft portion 520. The movement of the hammer assembly 200 in the scale direction may be restricted by the second rib 595 instead of the first rib 591. The positions of the first rib 591 and the first curved portion 593 and the positions of the second rib 595 and the second curved portion 597 may be reversed. That is, the movement of the hammer assembly 200 in the scale direction may be restricted above the shaft portion 520.

Second Embodiment

Figure 14:
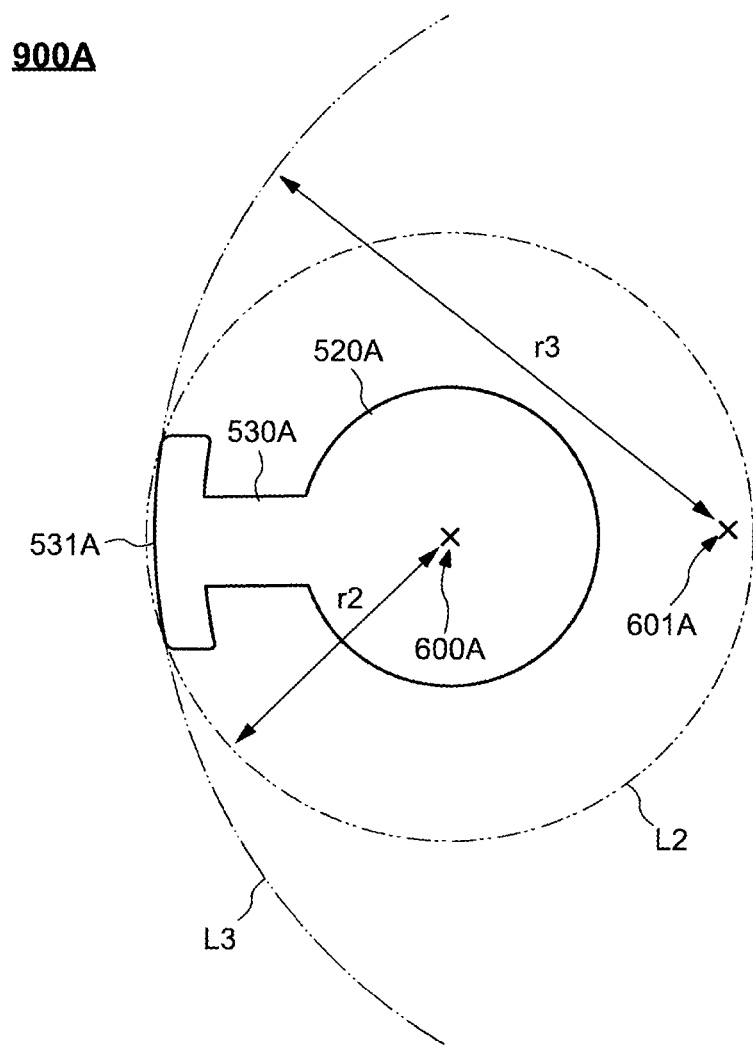
FIG. 14 is a side view of a shaft portion and a protruding portion of a rotation mechanism according to an embodiment of the present disclosure.

In the second embodiment, a rotation mechanism 900A having a configuration different from that of the rotation mechanism 900 according to the first embodiment will be described. FIG. 14 is a side view showing the shaft portion and the protruding portion of the rotation mechanism in an embodiment of the present disclosure. In the rotation mechanism 900A of the second embodiment, the shape of a protruding portion 530A is different from the shape of the protruding portion 530 of the first embodiment. The protruding portion 530A shown in FIG. 14 is similar to the protruding portion 530 of FIGS. 4 and 5, but the shape of a stopper contact portion 531A differs from the shape of the stopper contact portion 531. In the following description, description of the same features as those of the protruding portion 530 of FIGS. 4 and 5 will be omitted, and description will be made mainly on points different from those of the protruding portion 530.

As shown in FIG. 14, the stopper contact portion 531A is a part of an arc of a circle L3. The center of the circle L3 is the center of rotation 601A. A distance from the center of rotation 601A to the stopper contact portion 531A exceeds a distance from the center of rotation 600A to the stopper contact portion 531A. Radius r3 of the circle L3 is larger than the radius r2 of the circle L2. The circle L2 is a circumscribed circle circumscribing the protruding portion 530A and the circumscribed circle is a circle with the center of rotation 600A as a center of rotation.

Figure 15:
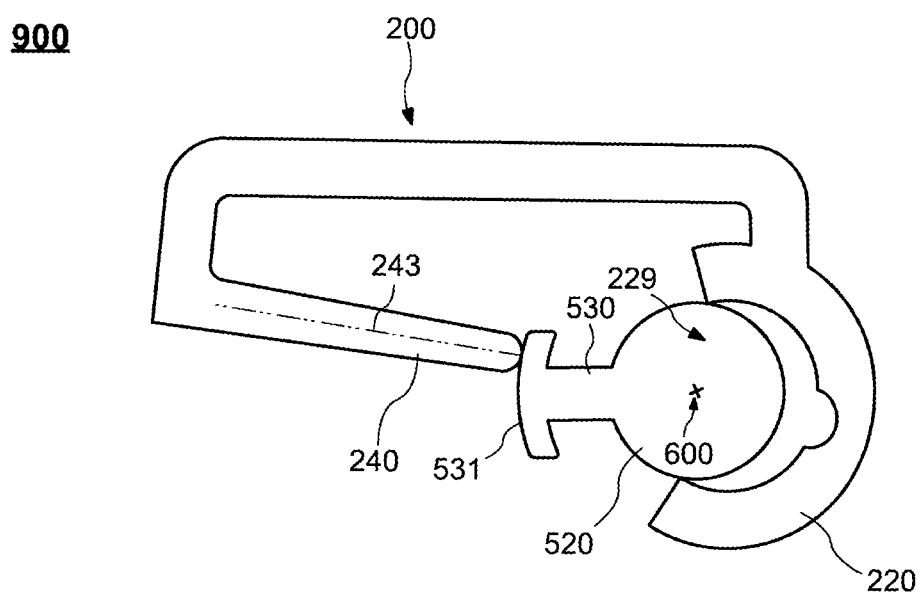
FIG. 15 is a diagram showing a state in a case where a rotation member intends to detach from a shaft portion according to an embodiment of the present disclosure.
Figure 16:
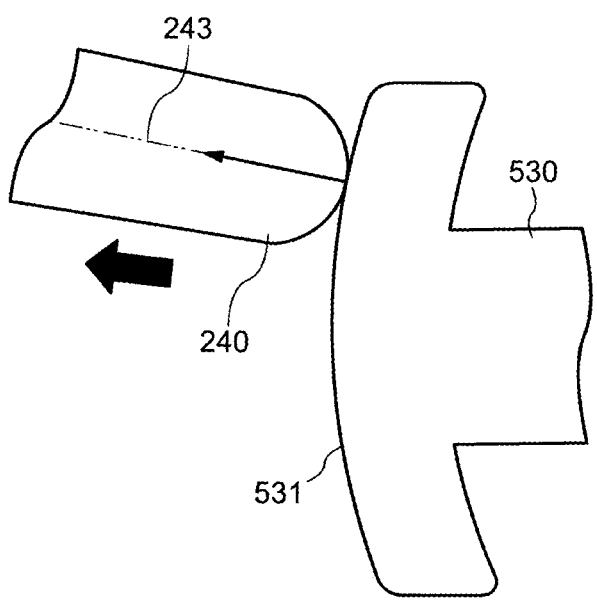
FIG. 16 is a diagram showing a state in a case where a rotation member intends to detach from a shaft portion according to an embodiment of the present disclosure.
Figure 17:
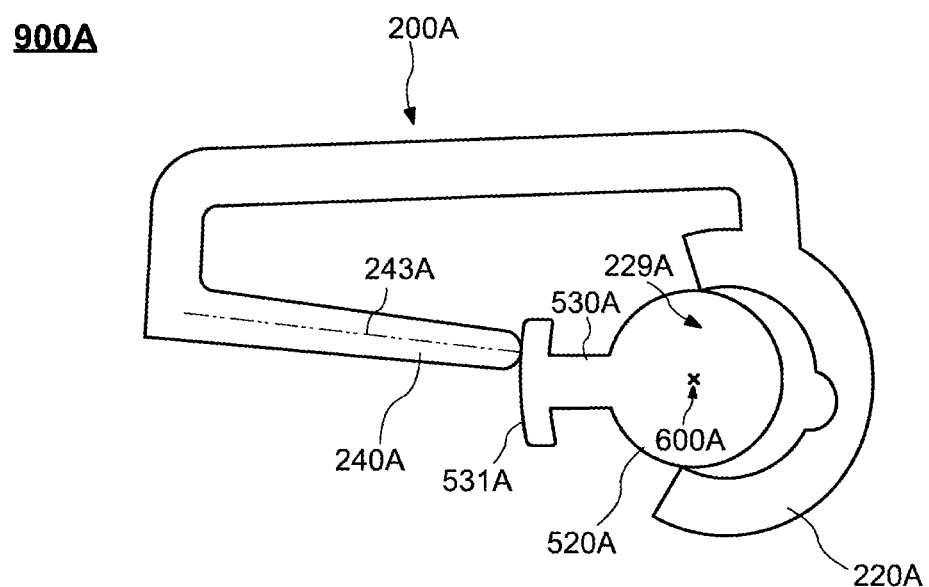
FIG. 17 is a diagram showing a state in a case where a rotation member intends to detach from a shaft portion according to an embodiment of the present disclosure.
Figure 18:
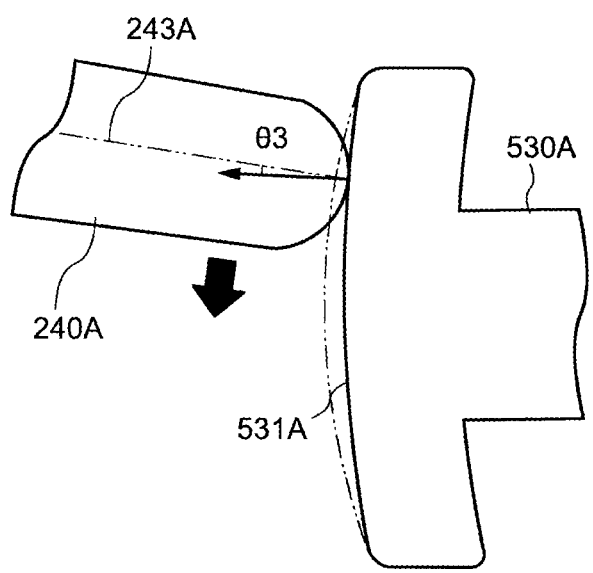
FIG. 18 is a diagram showing a state in a case where a rotation member intends to detach from a shaft portion according to an embodiment of the present disclosure.
Figure 19:
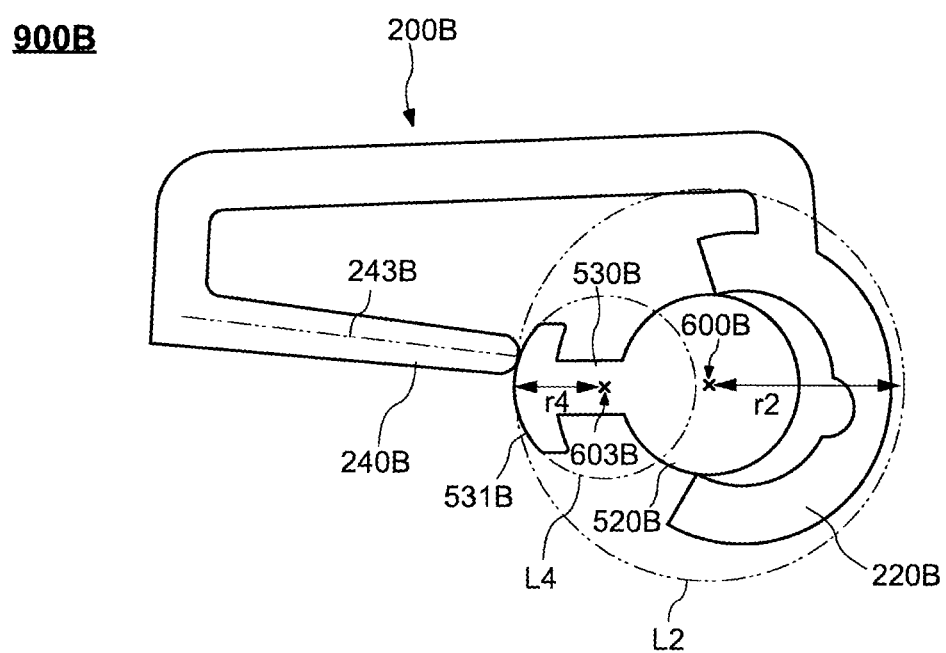
FIG. 19 is a diagram showing a state in a case where a rotation member intends to detach from a shaft portion according to an embodiment of the present disclosure.
Figure 20:
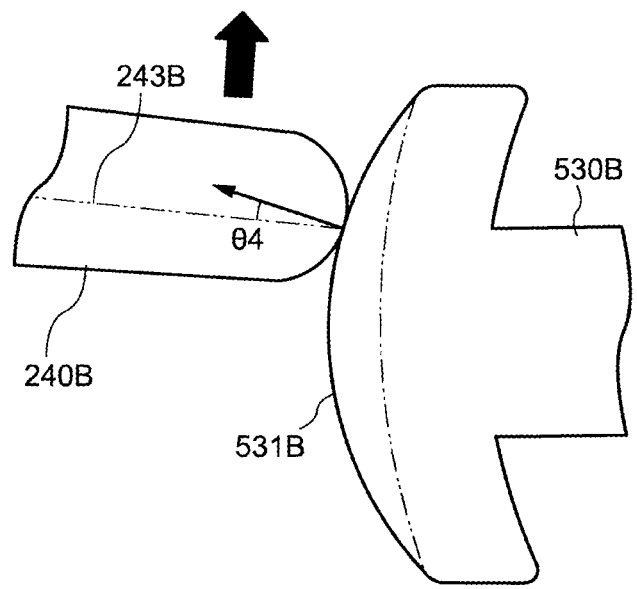
FIG. 20 is a diagram showing a state in a case where a rotation member intends to detach from a shaft portion according to an embodiment of the present disclosure.

The effect obtained by the configuration of the rotation mechanism 900A according to the present embodiment will be described referring to FIGS. 15 to 20. FIGS. 15 to 20 are diagrams showing states in which the rotation member intending to detach from the shaft portion in an embodiment of the present disclosure. FIGS. 15, 17 and 19 show the entire rotation mechanism. FIGS. 16, 18, and 20 shows a direction in which the stopper contact portion acts on the stopper. FIGS. 15 and 16 show the rotation mechanism 900 according to the first embodiment. FIGS. 17 and 18 show the rotation mechanism 900A according to the second embodiment. FIGS. 19 and 20 show a rotation mechanism 900B according to a modification of the second embodiment. The rotation mechanisms 900, 900A, and 900B have different shapes of the stopper contact portions. The shape of the stopper contact portion 531 of FIGS. 15 and 16 and the shape of the stopper contact portion 531A of FIGS. 17 and 18 are as described above. In FIGS. 15 to 20, the stoppers 240, 240A, 240B extend toward the center of rotations 600, 600A, 600B in a case where the bearing portions 220, 220A, 220B is normally held in the shaft portions 520, 520A, 520B.

As shown in FIGS. 15 and 16, in a state in which the stopper 240 is in contact with the stopper contact portion 531, the stopper 240 is affected by the action in a direction 243 in which the stopper 240 extends from the stopper contact portion 531. That is, when the stopper 240 is depressed by the stopper contact portion 531, the stopper 240 is hardly affected in the direction of moving the stopper 240 up and down.

As shown in FIGS. 17 and 18, in a state in which the stopper 240A contacts the stopper contact portion 531A, the stopper 240A receives an action from the stopper contact portion 531A. The direction of the action received by the stopper 240A is a direction inclined at an angle θ3 downward from a direction 243A in which the stopper 240A extends. As a result, when the stopper 240A is in contact with the stopper contact portion 531A, the stopper 240A intends to move downward by the force of the stopper contact portion 531A pushing the stopper 240A. That is, when the stopper contact portion 531A contacts the stopper 240A in a case where the bearing portion 220A intends to detach from the shaft portion 520A, the stopper contact portion 531A affects the stopper 240A so as to move the position of the stopper 240A toward the center of the stopper contact portion 531A. That is, in the rotation mechanism 900A shown in FIGS. 17 and 18, the stopper 240A is less likely to detach from the range of the stopper contact portion 531A as compared with the rotation mechanism 900 shown in FIGS. 15 and 16.

As shown in FIG. 19, a stopper contact portion 531B is a part of an arc of a circle L4. The center of the circle L4 is the center of rotation 603B. A distance from the center of rotation 603B to the stopper contact portion 531B is less than a distance from the center of rotation 600B to the stopper contact portion 531B. Radius r4 of the circle L4 is smaller than the radius r2 of the circle L2. The circle L2 is a circumscribed circle circumscribing the protruding portion 530B and the circumscribed circle is a circle with the center of rotation 600B as a center of rotation.

As shown in FIG. 20, in a state where the stopper 240B is in contact with the stopper contact portion 531B, the stopper 240B receives an action from the stopper contact portion 531B. The direction of the action received by the stopper 240B is a direction inclined at an angle θ4 upward from a direction 243B in which the stopper 240B extends. As a result, when the stopper 240B is in contact with the stopper contact portion 531B, the stopper 240B intends to move upward by the force of the stopper contact portion 531B pushing the stopper 240B. That is, when the stopper contact portion 531B contacts the stopper 240B in a case where the bearing portion 220B intends to detach from the shaft portion 520B, the stopper contact portion 531B affects the stopper 240B so as to move the position of the stopper 240B in a direction away from the stopper contact portion 531B. That is, in the rotation mechanism 900B shown in FIGS. 19 and 20, the bearing portion 220B is detached from the shaft portion 520B when a strong external force is applied, so that the load applied to the stopper 240B is smaller than the load applied to the rotation mechanism 900 shown in FIGS. 15 and 16.

As described above, in the state in which the stoppers 240, 240A, and 240B contact the stopper contact portions 531, 531A, and 531B, the direction in which the stopper contact portion pushes the stopper can be adjusted by the normal direction at these contact points. As a result, the following effects are obtained. When the normal direction at the contact point between the stopper 240A and the stopper contact portion 531A is inclined in the direction of the angle θ3 (FIG. 18), since the stopper 240A is moved in the direction of the arrow in the figure (downward), and therefore, the stopper 240A hardly detaches from the contact range of the stopper contact portion 531A. When the normal direction at the contact point between the stopper 240B and the stopper contact portion 531B is inclined in the direction of the angle θ4 (FIG. 20), since the stopper 240B is moved in the direction of the arrow in the drawing (upward), the stopper 240B is less likely to break. When the normal direction at the contact point between the stopper 240 and the stopper contact portion 531 is the direction 243 in which the stopper 240 extends (in a case where the above angle θ3=θ4=0°, the stopper 240 does not move in the vertical direction. Therefore, the force that the stopper 240 supports the stopper contact portion 531 is the largest among the configurations of FIGS. 16, 18, and 20. As described above, the shape of the stopper contact portion can be appropriately selected in consideration of the detachment preventing function, the load on the stopper, or the like.

Third Embodiment

Figure 21:
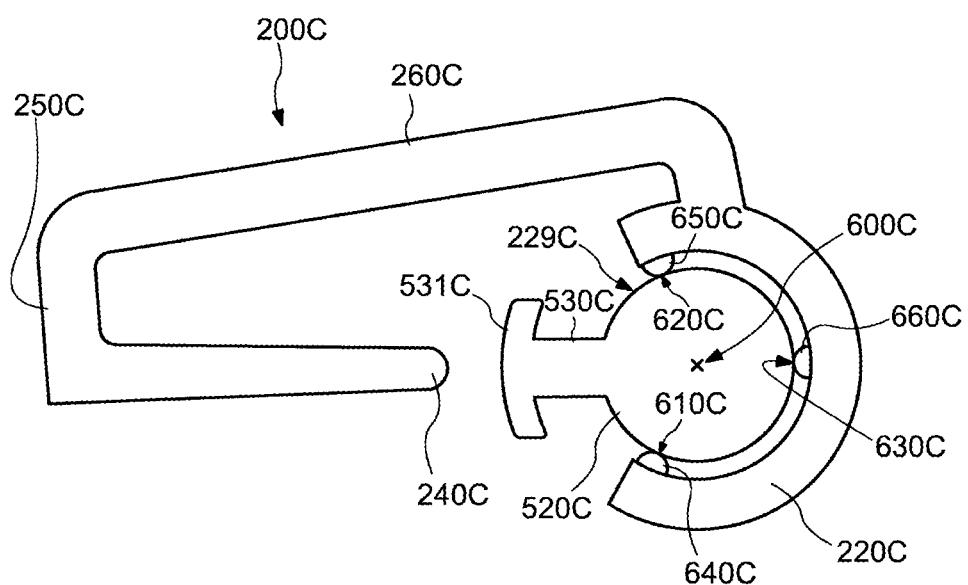
FIG. 21 is a partial enlarged view of a rotation mechanism according to an embodiment of the present disclosure.

In the third embodiment, a rotation mechanism 900C having a configuration different from that of the rotation mechanism 900 in the first embodiment will be described. FIG. 21 is a partial enlarged view of a rotation mechanism according to an embodiment of the present disclosure. In the rotation mechanism 900C of the third embodiment, the shape of a bearing portion 220C differs from the shape of the bearing portion 220 of the first embodiment (referring to FIGS. 4 and 5). In the following description, the same features as the bearing portion 220 of FIGS. 4 and 5 will be omitted, primarily described differences from the bearing portion 220.

As shown in FIG. 21, protruding portions 640C, 650C, and 660C are provided on the inner surface of the opening 229C. Each of the protruding portions 640C, 650C, 660C protrudes from the inner surface of the opening 229C toward the shaft portion 520C and is in contact with the shaft portion 520C. The protrusion 640C is provided in the vicinity of the opening end portion 610C. The protrusion 650C is provided in the vicinity of an opening end portion 620C. While these protruding portions slide relative to the shaft portion 520C, the bearing 220C rotates around the shaft portion 520C. The protruding portions 640C, 650C, and 660C extend in the direction in which the shaft portion 520C extends. In FIG. 21, the center of rotation 600C is on a triangle formed by the contact points of the protruding portions 640C, 650C, 660C and the shaft portion 520C. In other words, the angle formed by the straight lines extending from the center of rotation 600C to the three contact points is 180 degrees or less.

As described above, according to the rotation mechanism 900C, in addition to the same effects as the first embodiment and the second embodiment, since an area in contact with the shaft portion 520C is small, the frictional resistance when the bearing portion 220C is rotated is small.

The protruding portion described in the above embodiment may be formed integrally with the bearing portion 220C or may be formed separately from the bearing portion 220C and fixed to the bearing portion 220C. In the present embodiment, a configuration in which the protruding portion is provided on the inner surface of the opening 229C is exemplified, but the present invention is not limited to this configuration. For example, instead of the above-mentioned protruding portions 640C, 650C, and 660C, protruding portions protruding from the shaft portion 520C toward the bearing portion 220C may be provided on the outer surface of the shaft portion 520C.

Figure 22:
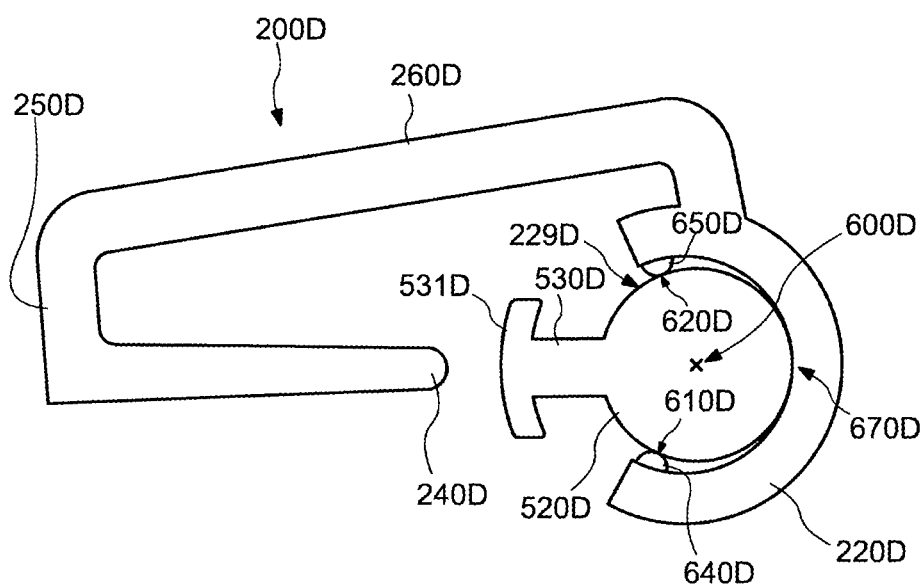
FIG. 22 is a partial enlarged view of a rotation mechanism according to an embodiment of the present disclosure.

In the present embodiment, a configuration in which the bearing portion 220C is supported by the shaft portion 520C by the three protrusions is exemplified, but the present invention is not limited to this configuration. For example, as shown in FIG. 22, protruding portions 640D and 650D may be provided only on opening end portions 610D and 620D, respectively. In other words, the shaft portion 520D may be in point contact with the protrusions 640D and 650D in the vicinity of the opening end portion 610D and 620D, and the shaft portion 520D may be in surface contact with the inner surface of the opening 229D in a contact region 670D. As described above, the protruding portions 640D and 650D may be formed integrally with the bearing portion 220D or may be formed separately.

Fourth Embodiment

Figure 23:
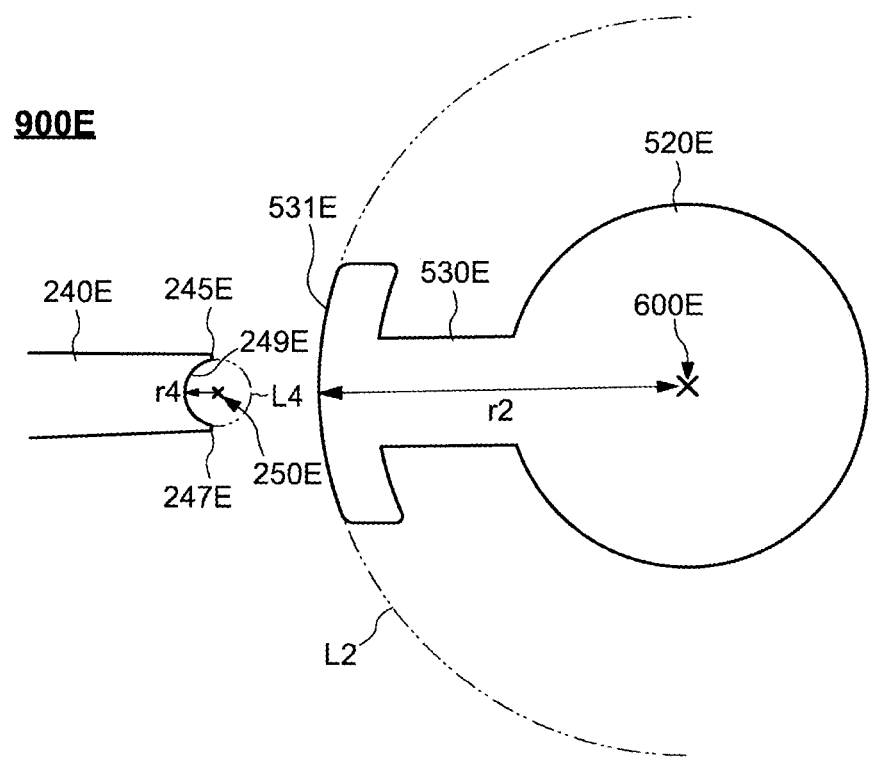
FIG. 23 is a partial enlarged view of a rotation mechanism according to an embodiment of the present disclosure.

In the fourth embodiment, a rotation mechanism 900E having a configuration different from that of the rotation mechanism 900 in the first embodiment will be described. FIG. 23 is a partial enlarged view of a rotation mechanism according to an embodiment of the present disclosure. In the rotation mechanism 900E of the fourth embodiment, the shape of a stopper 240E is different from the shape of the stopper 240 of the first embodiment (referring to FIGS. 4 and 5). In the following description, descriptions of the same features as those of the stopper 240 in FIGS. 4 and 5 are omitted and points different from those of the stopper 240 will be mainly described.

As shown in FIG. 23, a tip portion of the stopper 240E is bifurcated shape. The stopper 240E has a first tip portion 245E and a second tip portion 247E. Each of the first tip portion 245E and the second tip portion 247E extends toward the scale direction. However, the widths of the scale direction of the first tip portion 245E and the second tip portion 247E are smaller than the distance between the adjacent wall member 590 shown in FIG. 12. A concave portion 249E is provided between the first tip portion 245E and the second tip portion 247E. The shape of the concave portion 249E is a part of the arc of the circle L4. The radius of curvature r4 of the circle L4 is smaller than the radius of curvature r2 of the circle L2.

As described above, according to the rotation mechanism 900E of the present embodiment, in addition to the same effects as those of the first embodiment and the second embodiment, when the stopper contact portion 531E contacts the stopper 240E, the stopper 240E can be made difficult to slip on the stopper contact portion 531E.

In the state where the bearing portion integral with the stopper 240E is to be detached from the shaft portion 520E, the first tip portion 245E and the second tip portion 247E may contact the stopper contact portion 531E and the shaped of the concave portion 249E may not be a part of the arc. When the stopper 240E is to be detached as described above, the number of the tip portion of the stopper 240E being in contact with the stopper contact portion 531E may be three or more.

Fifth Embodiment

Figure 24:
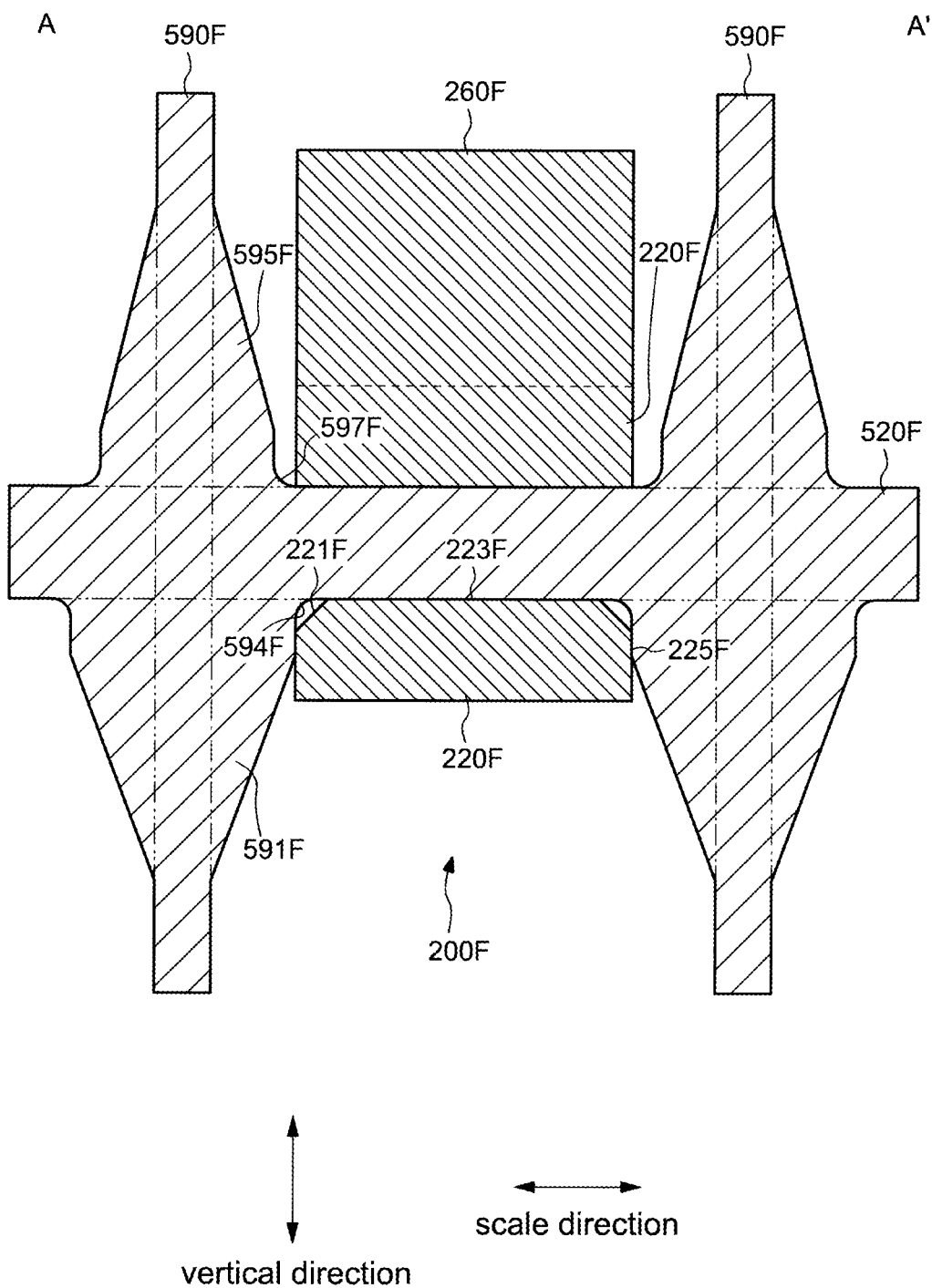
FIG. 24 is a cross-sectional view showing a hammer assembly and a shaft portion according to an embodiment of the present disclosure.

In the fifth embodiment, a rotation mechanism 900F having a configuration different from that of the rotation mechanism 900 in the first embodiment will be described. FIG. 24 is a cross-sectional view showing the hammer assembly and the shaft portion according to an embodiment of the present disclosure. In the rotation mechanism 900F of the fifth embodiment, the structure between a bearing portion 220F and a wall member 590F is different from that of the first embodiment (referring to FIG. 13). In the following description, descriptions of the same features as those of the configuration of FIG. 13 are omitted, and mainly points different from those of FIG. 13 will be described.

As shown in FIG. 24, a first rib 591F, a first curved portion 594F, a second rib 595F, and a second curved portion 597F are provided between the shaft portion 520F and the wall member 590F. The first curved portion 594F is curved below the shaft portion 520F so as to round the corner formed by the first rib 591F and the shaft portion 520F. In other words, the first curved portion 594F is provided so as to protrude downward of the shaft portion 520F. A notch portion 221F is provided in the bearing portion 220F corresponding to the first curved portion 594F. The notch portion 221F is provided so as to connect a side 223F in contact with the shaft portion 520F and a side 225F in contact with the first rib 591F. In FIG. 24, the notch portion 221F has a straight shape, but the notch portion 221F may have a curved shape similar to the first curved portion 594F.

As described above, according to the rotation mechanism 900F of the present embodiment, the same effect as that of the first embodiment can be obtained.

Sixth Embodiment

Figure 25:
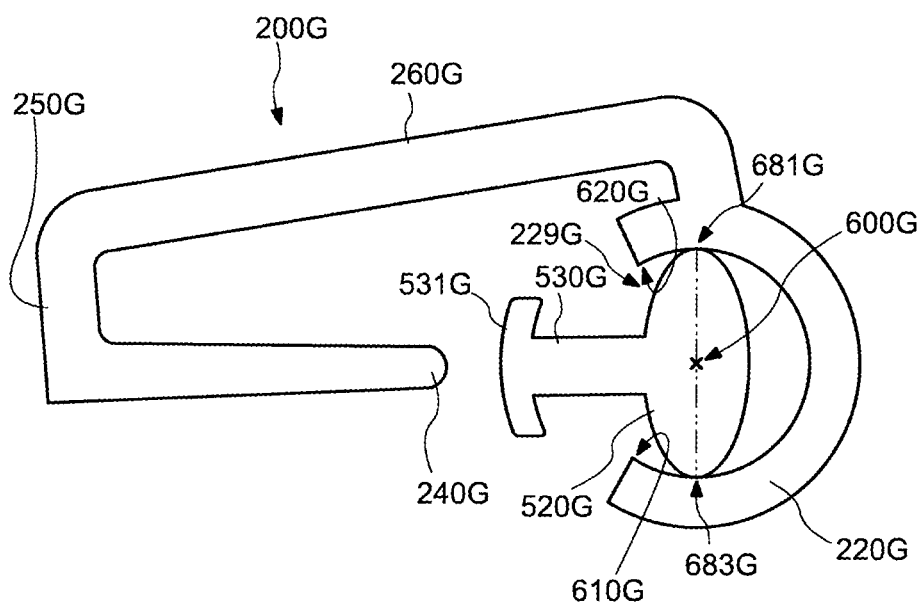
FIG. 25 is a partial enlarged view of a rotation mechanism according to an embodiment of the present disclosure.

In the sixth embodiment, a rotation mechanism 900G having a configuration different from that of the rotation mechanism 900 in the first embodiment will be described. FIG. 25 is a partial enlarged view of the rotation mechanism according to an embodiment of the present disclosure. In the rotation mechanism 900G of the sixth embodiment, the shape of the shaft portion 520G differs from the shape of the shaft portion 520 of the first embodiment (referring to FIGS. 4 and 5). In the following description, the description of the same features as those of FIGS. 4 and 5 is omitted, and the difference from the shaft portion 520 will be mainly described.

As shown in FIG. 25, the shaft portion 520G has an elliptical shape. The shaft portion 520G slides relative to a bearing portion 220G at two sliding portions 681G and 683G. The sliding portions 681G and 683G correspond to both ends of the long axis of the elliptical shape of the shaft portion 520G. That is, the straight line connecting the sliding portions 681G and 683G is a line passing through the center of rotation 600G, and the center of rotation 600G is positioned at the middle of the sliding portions 681G and 683G. The distance between the sliding portions 681G and 683G is larger than the distance between opening end portions 610G and 620G. That is, the bearing portion 220G is held at two points by the shaft portion 520G. The bearing portion 220G is detached from the shaft portion 520G when the bearing portion 220G rotates counterclockwise and the opening end portion 610G exceeds the sliding portion 683G, or when the bearing portion 220G rotates clockwise and the opening end portion 620G exceeds the sliding portion 681G. In the present embodiment, the configuration in which the shaft portion 520G is elliptical shape is exemplified, but the present invention is not limited to this configuration. For example, a straight line connecting the sliding portions 681G and 683G may pass through the center of rotation 600G, and the shaft portion 520G may have a shape other than an elliptical shape.

As described above, according to the rotation mechanism 900G of the present embodiment, in addition to the same effects as those of the first embodiment, the area at which the bearing portion 220G contacts the shaft portion 520G is small, so that the frictional resistance when the bearing portion 220G rotates is small.

Seventh Embodiment

Figure 26:
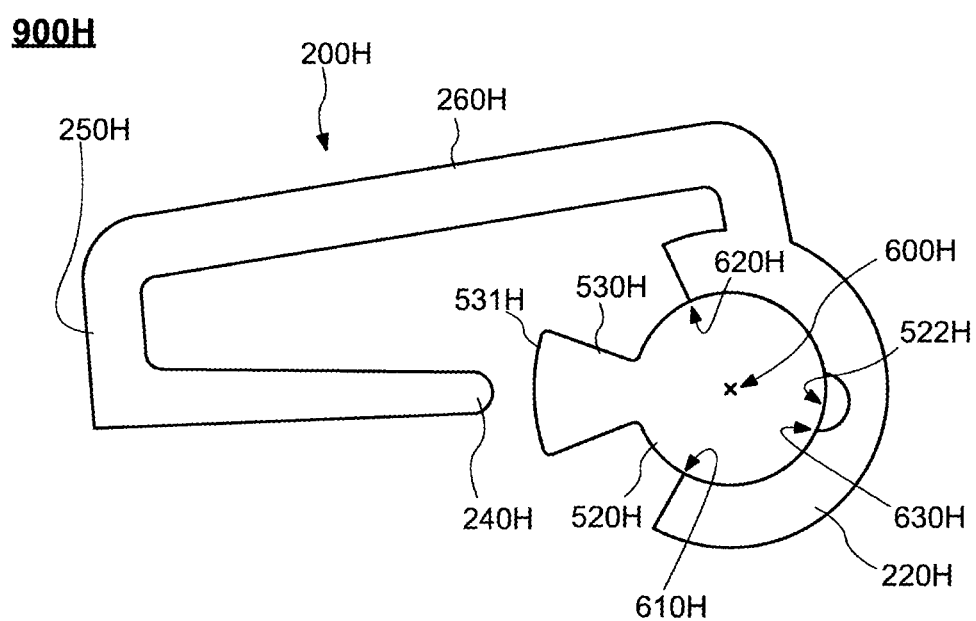
FIG. 26 is a partial enlarged view of a rotation mechanism according to an embodiment of the present disclosure.

In the seventh embodiment, a rotation mechanism 900H having a configuration different from that of the rotation mechanism 900 in the first embodiment will be described. FIG. 26 is a partial enlarged view of the rotation mechanism according to an embodiment of the present disclosure. In the rotation mechanism 900H of the seventh embodiment, the shape of a protruding portion 530H is different from the shape of the protruding portion 530 of the first embodiment (referring to FIGS. 4 and 5). In the following description, the description of the same features as those of FIGS. 4 and 5 is omitted, and the difference from the protruding portion 530 will be mainly described.

As shown in FIG. 26, the protruding portion 530H has a shape that gradually widens from the shaft portion 520H toward the stopper contact portion 531H. In other words, the protruding portion 530H is substantially fan-shaped. In the first to sixth embodiments, the configuration in which the protruding portion 530 is substantially T-shaped has been exemplified, but the present invention is not limited to this configuration, and various forms are applied as in the seventh embodiment.

Eighth Embodiment

In the eighth embodiment, a rotation mechanism 900J having a configuration different from that of the rotation mechanism 900 in the first embodiment will be described.

Figure 27:
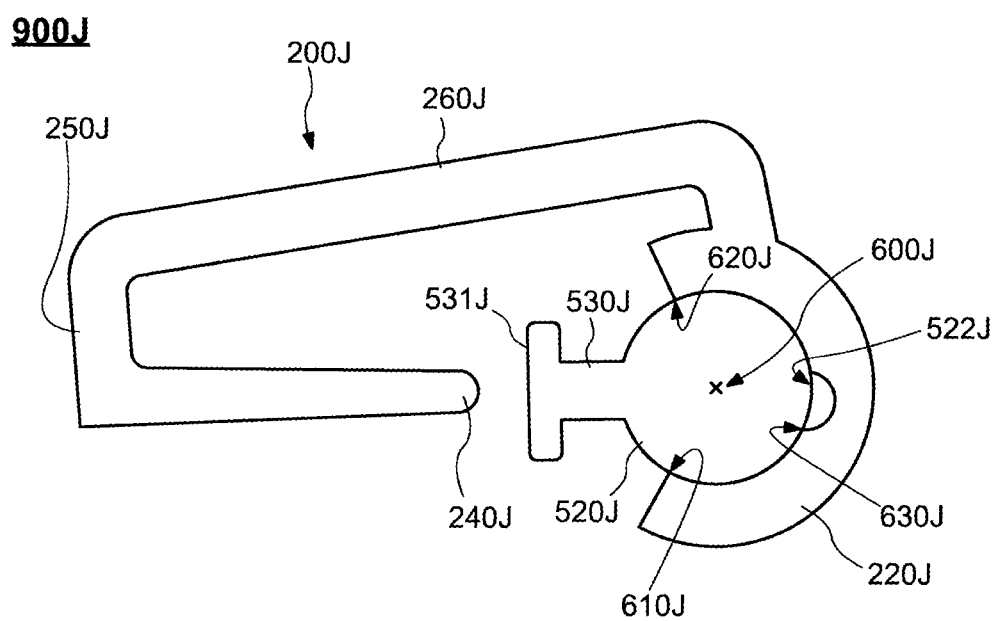
FIG. 27 is a partial enlarged view of a rotation mechanism according to an embodiment of the present disclosure.

FIG. 27 is a partial enlarged view of the rotation mechanism according to an embodiment of the present disclosure. In the rotation mechanism 900J of the eighth embodiment, the shape of the stopper contact portion 531J is different from the shape of the stopper contact portion 531 shown in FIG. 4. Specifically, the shape of the stopper contact portion 531J is not a part of a circular arc but a flat surface. The shape of the stopper contact portion 531J according to the present embodiment corresponds to the case where the radius r3 of the circle L3 is infinite in the stopper contact portion 531A shown in FIG. 14. Therefore, according to the rotation mechanism 900J of the present embodiment, the same effects as those of the first embodiment and the second embodiment can be obtained.

In the present embodiment, an example in which the shape of the stopper contact portion 531J is formed by one plane is shown, but the present invention is not limited to this configuration. For example, the stopper contact portion 531J may be configured by a plurality of planes, may be configured by a combination of a plane and a curved surface (e.g., an arc-shaped curved surface such as the stopper contact portion 531 of the first embodiment), or may be configured by a combination of a curved surface having different radii of curvature.

Ninth Embodiment

Figure 28:
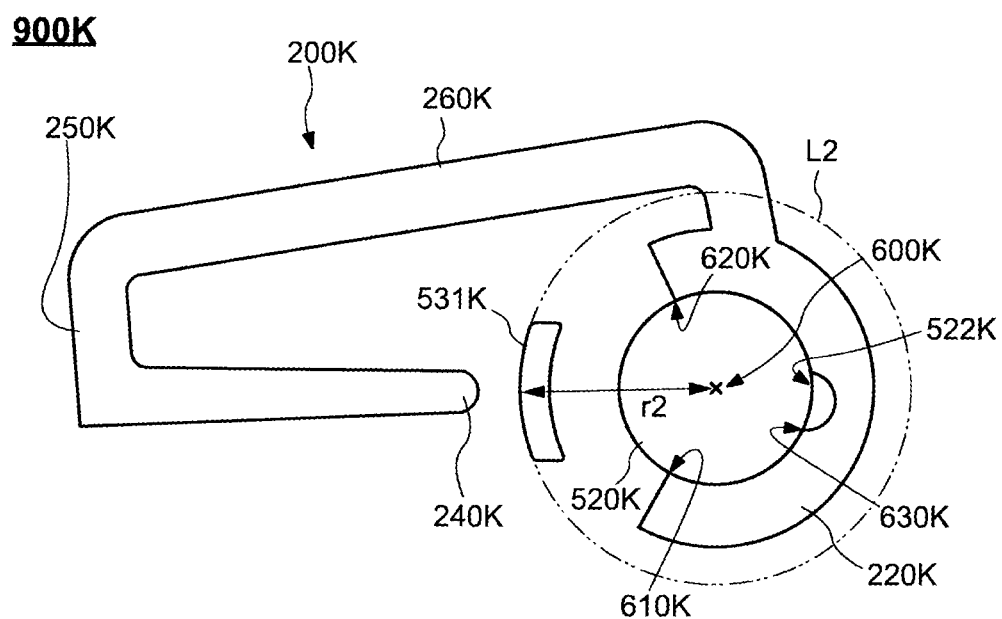
FIG. 28 is a partial enlarged view of a rotation mechanism according to an embodiment of the present disclosure.
Figure 29:
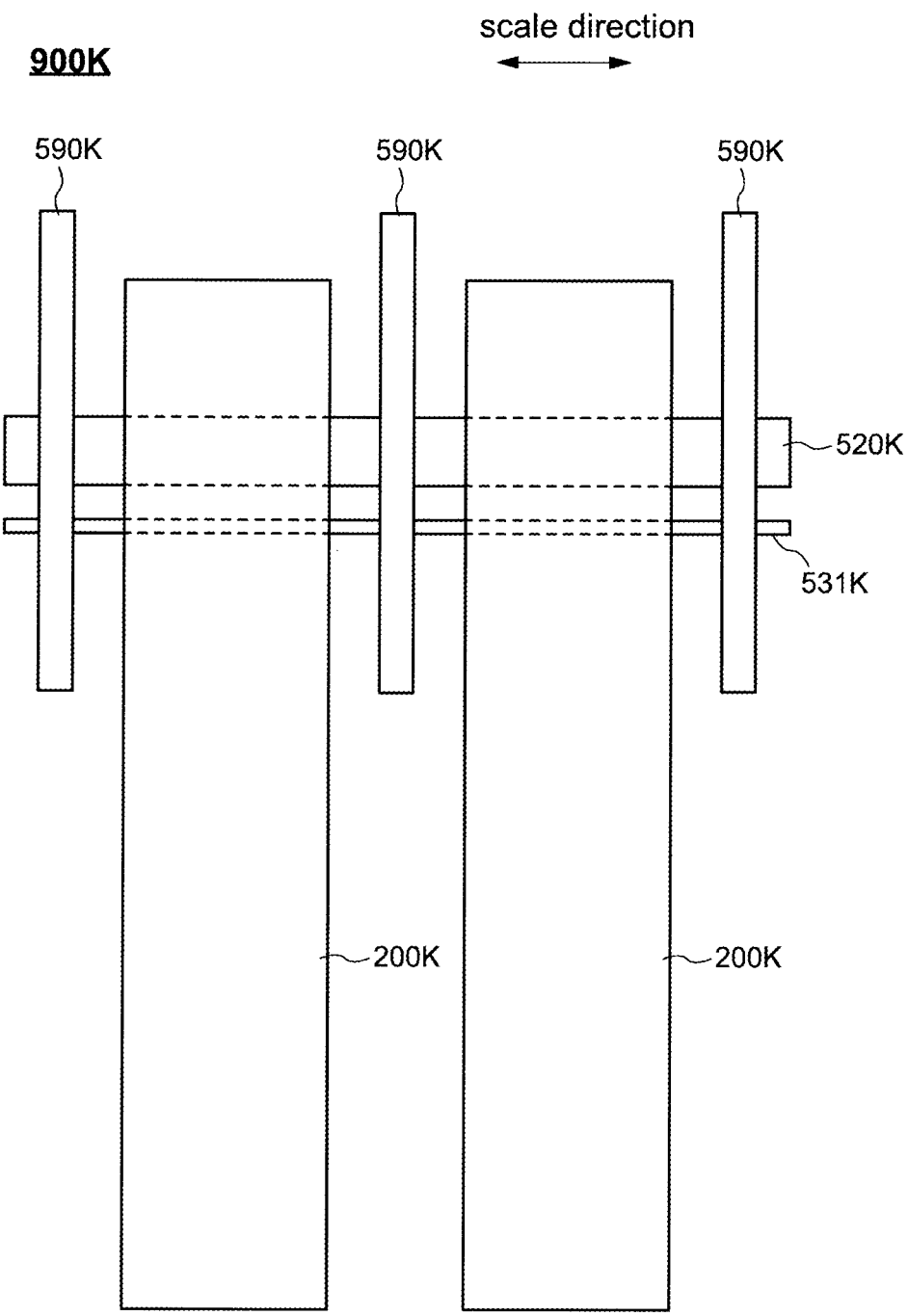
FIG. 29 is a top view showing a hammer assembly and a shaft portion according to an embodiment of the present disclosure.

In the ninth embodiment, a rotation mechanism 900K having a configuration different from that of the rotation mechanism 900 in the first embodiment will be described. FIG. 28 is a partial enlarged view of the rotation mechanism according to an embodiment of the present disclosure. FIG. 29 is a top view showing a hammer assembly and a shaft portion according to an embodiment of the present disclosure.

As shown in FIGS. 28 and 29, the stopper contact portion 531K is separated from the shaft portion 520K. That is, in the side view of FIG. 28, a member corresponding to the protruding portion 530 shown in FIG. 4 is not provided, and the stopper contact portion 531K and the shaft portion 520K are independent of each other. However, as shown in FIG. 29, the stopper contact portion 531K and the shaft portion 520K are connected via the wall member 590K. In other words, the stopper contact 531K and the shaft portion 520K are connected to the wall member 590K on the outer sides of both ends of a hammer assembly 200K in the scale direction. The stopper contact portion 531K and the shaft portion 520K may or may not be fixed to the wall member 590K. For example, the shaft portion 520K may be rotatably attached to the wall member 590K. The stopper contact portion 531K may be slidably attached to the wall member 590K.

As described above, according to the rotation mechanism 900K of the present embodiment, since the stopper contact portion 531K and the shaft portion 520K are connected via the wall member 590K, the external force applied to the shaft portion 520K is dispersed to the stopper contact portion 531K, so that the mechanical strength of the shaft portion 520K is improved.

Tenth Embodiment

Figure 30:
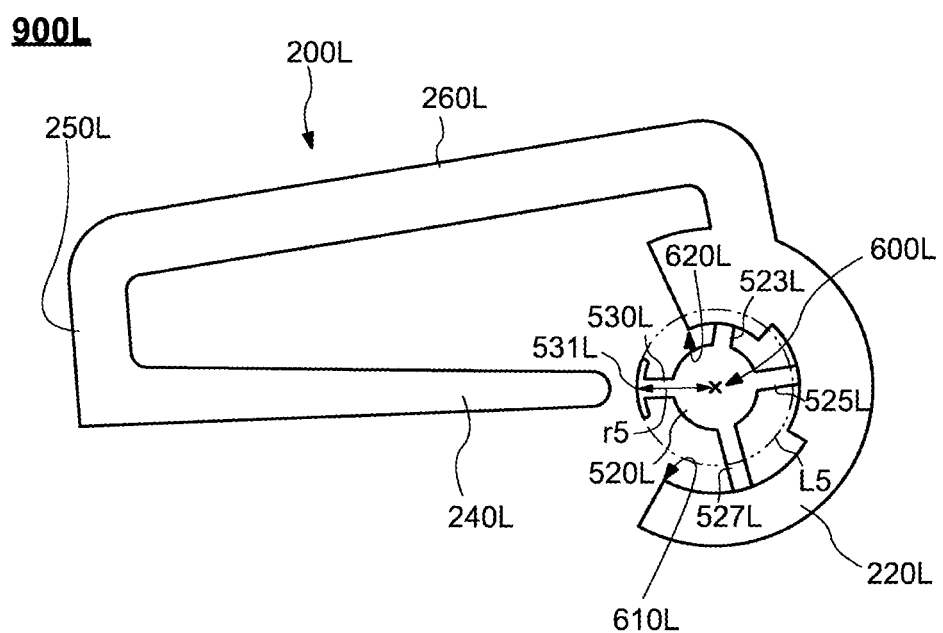
FIG. 30 is a partial enlarged view of a rotation mechanism according to an embodiment of the present disclosure.

In the tenth embodiment, a rotation mechanism 900L having a configuration different from that of the rotation mechanism 900 in the first embodiment will be described. FIG. 30 is a partial enlarged view of a rotation mechanism according to an embodiment of the present disclosure. In the rotation mechanism 900L of the tenth embodiment, the shape of the portion where the shaft portion 520L and the bearing portion 220L slide differs from the shape of the rotation mechanism 900 shown in FIG. 4.

As shown in FIG. 30, the shaft portion 520L includes a first sliding portion 523L, a second sliding portion 525L, and a third sliding portion 527L. These three sliding portions protrude from the shaft portion 520L toward the inner wall of the bearing portion 220L and are in contact with the inner wall. The lengths from the center of rotation 600L to tips of the first sliding portion 523L, the second sliding portion 525L, and the third sliding portion 527L (hereinafter, simply referred to as the length of each sliding portion) differ. Specifically, the length of the second sliding portion 525L is larger than the length of the first sliding portion 523L. The length of the third sliding portion 527L is larger than the length of the second sliding portion 525L. The inner wall of the bearing portion 220L has an arc shape of the circle. The center of the circle is the center of rotation 600L corresponding to the length of each sliding portion.

The length from the center of rotation 600L to the tip (stopper contact portion 531L) of the protruding portion 530L (hereinafter, simply referred to as the length of the protruding portion 530L) is r5. The shape of the stopper contact portion 531L is a part of an arc of a circle L5 having a radius r5. The center of the circle L5 is the center of rotation 600L. As shown in FIG. 30, the length of the protruding portion 530L is larger than the length of the first sliding portion 523L. On the other hand, the length of the protruding portion 530L is smaller than the lengths of the second sliding portion 525L and the third sliding portion 527L. In other words, the above configuration, the protruding portion 530L protrudes farther than the sliding portion (the first sliding portion 523L) with respect to the center of rotation 600L. The sliding portion (the first sliding portion 523L) is the closest to the center of rotation 600L among the sliding portions (the first sliding portion 523L, the second sliding portion 525L, and the third sliding portion 527L) where the shaft portion 520L and the bearing portion 220L slide each other. In other words, a part of the sliding portion in which the shaft portion 520L and the bearing portion 220L slide is located inside the circle L5 which is in contact with the tip of the protruding portion 530L. The center of the circle L5 is the center of rotation 600L.

As described above, according to the rotation mechanism 900L of the present embodiment, the same effect as that of the first embodiment can be obtained.

In the embodiments described above, an electronic piano has been shown as an example of the keyboard apparatus to which the hammer assembly had been applied. On the other hand, the hammer assembly of the above embodiments can be applied to a rotation mechanism of an acoustic piano such as a grand piano or an upright piano. For example, in the upright piano, a rotation mechanism of the above-described embodiments can be applied to a rotation mechanism having a rotating component and a support unit that rotatably supports the rotating component. In this case, the sound-producing mechanism corresponds to the hammer and the string. The rotation mechanism of the above embodiments can be applied to a rotation component other than a piano.

The present disclosure is not limited to the above-described embodiments and can be appropriately modified within a range not departing from the spirit.

REFERENCE SIGNS LIST

1: keyboard apparatus
10: keyboard assembly

70: sound source apparatus
80: speaker
90: housing
100: key
120: hammer support unit
151: front end key guide
153: side surface key guide
180: connection portion
181: board-shaped flexible member
183: key-side support portion
185: rotation member
200: hammer assembly
210: front end portion
220: bearing portion
221F: notch portion
223F, 225F: side
229: opening
230: weight portion
240: stopper
241: tip portion
243: direction
245E: first tip portion
247E: second tip portion
249E: concave portion
250: connecting portion
260: body portion
300: sensor
410: lower stopper
430: upper stopper
500: frame
511: front end frame guide
513: side surface frame guide
520: shaft portion
522: concave portion
523L: first sliding portion
525L: second sliding portion
527L: third sliding portion
530: protruding portion
531: stopper contact portion (stopper-contacting portion)
585: frame-side support portion
590: wall member
591: first rib
592: inclined surface
593, 594F: first curved portion
595: second rib
596: inclined surface
597: second curved portion
600: center of rotation
601A, 603B: center of rotation
610, 620: opening end portion
615: line segment
630: contact point
640C, 650C, 660C: protruding portion
670D: contact region
681G, 683G: sliding portion
710: signal converter
730: sound source unit
750: output unit
900: rotation mechanism

What is claimed is:

1. A rotation mechanism comprising:
a shaft portion;
a bearing portion configured to rotate with respect to a predetermined axis as a center of rotation and configured to slide relative to an outer periphery of the shaft portion;
a protruding portion protruding from the shaft portion; and
a stopper integrally formed with the bearing portion, the stopper facing the protruding portion,
wherein a length of the protruding portion in a direction in which the protruding portion protrudes is larger than a distance from the center of rotation to a sliding portion where the bearing portion slides relative to the outer periphery of the shaft portion, and
wherein a distance from the center of rotation to the stopper exceeds a distance from a line connecting both of opening ends of the bearing portion being in contact with the shaft portion to the stopper in a case where the bearing portion intends to detach from the shaft portion and the protruding portion contacts the stopper.

2. A keyboard apparatus comprising:
a key;
a hammer assembly rotated by the rotation mechanism according to claim 1 in response to a press of the key;
a sensor configured to detect an operation of the key; and
a sound source unit configured to generate an acoustic waveform signal in response to an output signal from the sensor.

3. A rotation mechanism comprising:
a shaft portion;
a bearing portion configured to rotate with respect to a predetermined axis as a center of rotation and configured to slide relative to an outer periphery of the shaft portion;
a protruding portion protruding from the shaft portion;
a stopper integrally formed with the bearing portion, the stopper facing the protruding portion; and
a reinforcing member extending in a direction intersecting a direction in which the shaft portion extends,
wherein a length of the protruding portion in a direction in which the protruding portion protrudes is larger than a distance from the center of rotation to a sliding portion where the bearing portion slides relative to the outer periphery of the shaft portion, and
wherein the shaft portion and the protruding portion are connected to the reinforcing member.

4. A rotation mechanism comprising:
a shaft portion;
a bearing portion configured to rotate with respect to a predetermined axis as a center of rotation and configured to slide relative to an outer periphery of the shaft portion;
a protruding portion protruding from the shaft portion; and
a stopper integrally formed with the bearing portion, the stopper facing the protruding portion,
wherein a length of the protruding portion in a direction in which the protruding portion protrudes is larger than a distance from the center of rotation to a sliding portion where the bearing portion slides relative to the outer periphery of the shaft portion,
wherein the protruding portion is spaced apart from the stopper in a case where the bearing portion is rotatably attached to the shaft portion,
wherein the bearing portion has an opening,
wherein the protruding portion protrudes from the opening, and
wherein a distance from the center of rotation to the stopper exceeds a distance from a line connecting both of opening ends of the bearing portion being in contact with the shaft portion to the stopper in a case where the bearing portion intends to detach from the shaft portion and the protruding portion contacts the stopper.

5. The rotation mechanism according to claim 4, wherein the protruding portion exists on a line connecting a tip portion of the stopper and the center of rotation in a rotation range of the bearing portion.

6. The rotation mechanism according to claim 5, wherein the protruding portion has a stopper-contacting portion, and
the stopper-contacting portion is configured to contact the stopper in the case where the bearing portion intends to detach from the shaft portion.

7. The rotation mechanism according to claim 6, wherein a shape of the stopper-contacting portion includes a part of an arc of a circle, and
a center of the circle coincides with the center of rotation.

8. The rotation mechanism according to claim 6, wherein a shape of the stopper-contacting portion includes a part of an arc of a circle, and
a distance from a center of the circle to the stopper-contacting portion exceeds a distance from the center of rotation to the stopper-contacting portion.

9. The rotation mechanism according to claim 6, wherein a shape of the stopper-contacting portion includes a part of an arc of a circle, and
a distance from a center of the circle to the stopper-contacting portion is less than a distance from the center of rotation to the stopper-contacting portion.

10. The rotation mechanism according to claim 6, wherein a shape of the stopper-contacting portion is a flat surface.

11. A rotation mechanism comprising:
a shaft portion;
a bearing portion configured to rotate with respect to a predetermined axis as a center of rotation and configured to slide relative to an outer periphery of the shaft portion;
a stopper integrally formed with the bearing portion;
a stopper-contacting portion disposed between the shaft portion and the stopper, the stopper-contacting portion being configured to contact the stopper in a case where the bearing portion intends to detach from the shaft portion; and
a reinforcing member extending in a direction intersecting a direction in which the shaft portion extends,
wherein the shaft portion and the stopper-contacting portion are connected to the reinforcing member outside of both of opening ends of the bearing portion.

* * * * *